US007750817B2

(12) United States Patent
Teller

(10) Patent No.: US 7,750,817 B2
(45) Date of Patent: Jul. 6, 2010

(54) SYSTEM AND METHOD USING A SCALE FOR MONITORING THE DISPENSING OF A BEVERAGE

(75) Inventor: David Teller, Miami, FL (US)

(73) Assignee: Beverage Metrics Holding Ltd, Baar (CH)

( * ) Notice: Subject to any disclaimer, the term of this patent is extended or adjusted under 35 U.S.C. 154(b) by 1037 days.

(21) Appl. No.: 11/428,448

(22) Filed: Jul. 3, 2006

(65) Prior Publication Data

US 2006/0238346 A1 Oct. 26, 2006

Related U.S. Application Data

(63) Continuation-in-part of application No. 10/243,545, filed on Sep. 16, 2002, now Pat. No. 7,196,624, and a continuation-in-part of application No. 09/964,679, filed on Sep. 28, 2001, now abandoned, which is a continuation of application No. 09/733,719, filed on Dec. 8, 2000, now Pat. No. 6,504,481.

(60) Provisional application No. 60/169,918, filed on Dec. 10, 1999, provisional application No. 60/311,366, filed on Aug. 13, 2001.

(51) Int. Cl.
*G08B 21/00* (2006.01)
*B67D 1/00* (2006.01)
*G04C 23/00* (2006.01)

(52) U.S. Cl. .................... 340/666; 340/689; 340/686.1; 340/309.16; 340/603; 222/55; 222/638; 222/639; 222/640; 222/644

(58) Field of Classification Search ........................ None
See application file for complete search history.

(56) References Cited

U.S. PATENT DOCUMENTS

| 3,170,597 | A | | 2/1965 | Reichenberger |
| 3,863,724 | A | | 2/1975 | Dalia, Jr. |
| 3,920,149 | A | | 11/1975 | Fortino et al. |
| 4,158,624 | A | | 6/1979 | Ford et al. |
| 4,168,410 | A | | 9/1979 | Norris |
| 4,278,186 | A | * | 7/1981 | Williamson .................. 222/36 |

(Continued)

FOREIGN PATENT DOCUMENTS

WO WO 81/01506 6/1981

(Continued)

*Primary Examiner*—Julie Lieu
(74) *Attorney, Agent, or Firm*—Katten Muchin Rosenman LLP

(57) ABSTRACT

The present invention provides systems and methods for monitoring the dispensing of a beverage from a dispensing apparatus into a container using a scale and other devices. Methods of the present invention may perform the following steps: measuring a scale time for the container on a scale, measuring a end weight for the container on the scale, and determining that a dispense event has occurred for the beverage based on whether a tilt condition of a dispensing apparatus occurred substantially within the scale time and based on whether the end weight of the beverage dispensed into the container approximates a serving based on point-of-sale information. In some embodiments the tilt condition is measured by a sensor device that does not contact the beverage being dispensed. Further embodiments may use pour time and the weight of the dispensing apparatus. The determined dispense event may determine the brand of the beverage dispensed.

88 Claims, 23 Drawing Sheets

U.S. PATENT DOCUMENTS

| | | | |
|---|---|---|---|
| 4,409,649 A | 10/1983 | Heeger | |
| 4,419,016 A | 12/1983 | Zoltan | |
| 4,433,795 A | 2/1984 | Maiefski et al. | |
| 4,494,656 A | 1/1985 | Shay et al. | |
| 4,530,247 A * | 7/1985 | Haas | 73/861 |
| 4,563,739 A | 1/1986 | Gerpheide et al. | |
| 4,660,742 A * | 4/1987 | Ozdemir | 222/36 |
| 4,695,954 A | 9/1987 | Rose et al. | |
| 4,884,212 A | 11/1989 | Stutsman | |
| 4,944,337 A | 7/1990 | Credle, Jr. et al. | |
| 4,961,533 A * | 10/1990 | Teller et al. | 177/25.19 |
| 4,978,946 A | 12/1990 | Nordholm et al. | |
| 4,997,012 A | 3/1991 | Kuziw | |
| 5,042,686 A | 8/1991 | Stucki | |
| 5,044,521 A | 9/1991 | Peckels | |
| 5,091,713 A | 2/1992 | Horne et al. | |
| 5,115,888 A | 5/1992 | Schneider | |
| 5,158,793 A | 10/1992 | Helbing | |
| 5,255,819 A | 10/1993 | Peckels | |
| 5,294,004 A | 3/1994 | Frank et al. | |
| 5,318,197 A * | 6/1994 | Martindale et al. | 222/1 |
| 5,329,459 A | 7/1994 | Kaufman et al. | |
| 5,350,082 A | 9/1994 | Kiriakides, Jr. et al. | |
| 5,379,916 A * | 1/1995 | Martindale et al. | 222/1 |
| 5,387,766 A | 2/1995 | Teller et al. | |
| 5,505,349 A | 4/1996 | Peckels | |
| 5,536,084 A | 7/1996 | Curtis et al. | |
| 5,557,529 A | 9/1996 | Warn et al. | |
| 5,564,803 A | 10/1996 | McDonald et al. | |
| 5,566,732 A | 10/1996 | Nelson | |
| RE35,439 E | 2/1997 | Rosenberger | |
| 5,603,430 A * | 2/1997 | Loehrke et al. | 222/1 |
| 5,646,912 A | 7/1997 | Cousin | |
| 5,663,887 A | 9/1997 | Warn et al. | |
| 5,722,526 A | 3/1998 | Sharrard | |
| 5,745,366 A | 4/1998 | Higham et al. | |
| 5,767,775 A | 6/1998 | Shukla et al. | |
| 5,816,443 A | 10/1998 | Bustos | |
| 5,831,861 A | 11/1998 | Warn et al. | |
| 5,854,994 A | 12/1998 | Canada et al. | |
| 5,884,292 A | 3/1999 | Baker et al. | |
| 5,889,676 A | 3/1999 | Kubo et al. | |
| 5,913,454 A | 6/1999 | McHale | |
| 5,927,540 A | 7/1999 | Godlewski | |
| 5,930,146 A | 7/1999 | Takenaka | |
| 5,930,766 A | 7/1999 | Gibb | |
| 5,953,923 A * | 9/1999 | Davies | 62/50.1 |
| 5,969,606 A | 10/1999 | Reber et al. | |
| 5,971,594 A | 10/1999 | Sahai et al. | |
| 5,986,219 A | 11/1999 | Carroll et al. | |
| 6,036,055 A * | 3/2000 | Mogadam et al. | 222/23 |
| 6,053,359 A | 4/2000 | Goulet et al. | |
| 6,056,108 A | 5/2000 | Buchi et al. | |
| 6,056,194 A | 5/2000 | Kolls | |
| 6,061,608 A * | 5/2000 | Moldavsky | 700/240 |
| 6,101,452 A | 8/2000 | Krall et al. | |
| 6,150,942 A | 11/2000 | O'Brien | |
| 6,164,491 A | 12/2000 | Bustos | |
| 6,175,779 B1 | 1/2001 | Barrett | |
| 6,249,717 B1 | 6/2001 | Nicholson et al. | |
| 6,393,966 B1 * | 5/2002 | Hart et al. | 99/280 |
| 6,427,871 B1 * | 8/2002 | Suero | 222/36 |
| 6,450,406 B2 | 9/2002 | Brown | |
| 6,564,121 B1 | 5/2003 | Wallace | |
| 6,604,019 B2 | 8/2003 | Ahlin et al. | |
| 6,606,605 B1 | 8/2003 | Kolls | |
| 6,718,311 B1 * | 4/2004 | Suo-Anttila | 705/28 |
| 6,854,642 B2 | 2/2005 | Metcalf et al. | |
| 7,006,894 B2 | 2/2006 | de la Huerga | |
| 2002/0087413 A1 | 7/2002 | Mahaffy et al. | |
| 2002/0107610 A1 | 8/2002 | Kaehler et al. | |
| 2002/0198624 A1 | 12/2002 | Greenwald | |
| 2003/0055589 A1 | 3/2003 | Mogadam | |
| 2003/0057226 A1 | 3/2003 | Long | |

FOREIGN PATENT DOCUMENTS

| | | |
|---|---|---|
| WO | WO 96/36950 | 11/1996 |

* cited by examiner

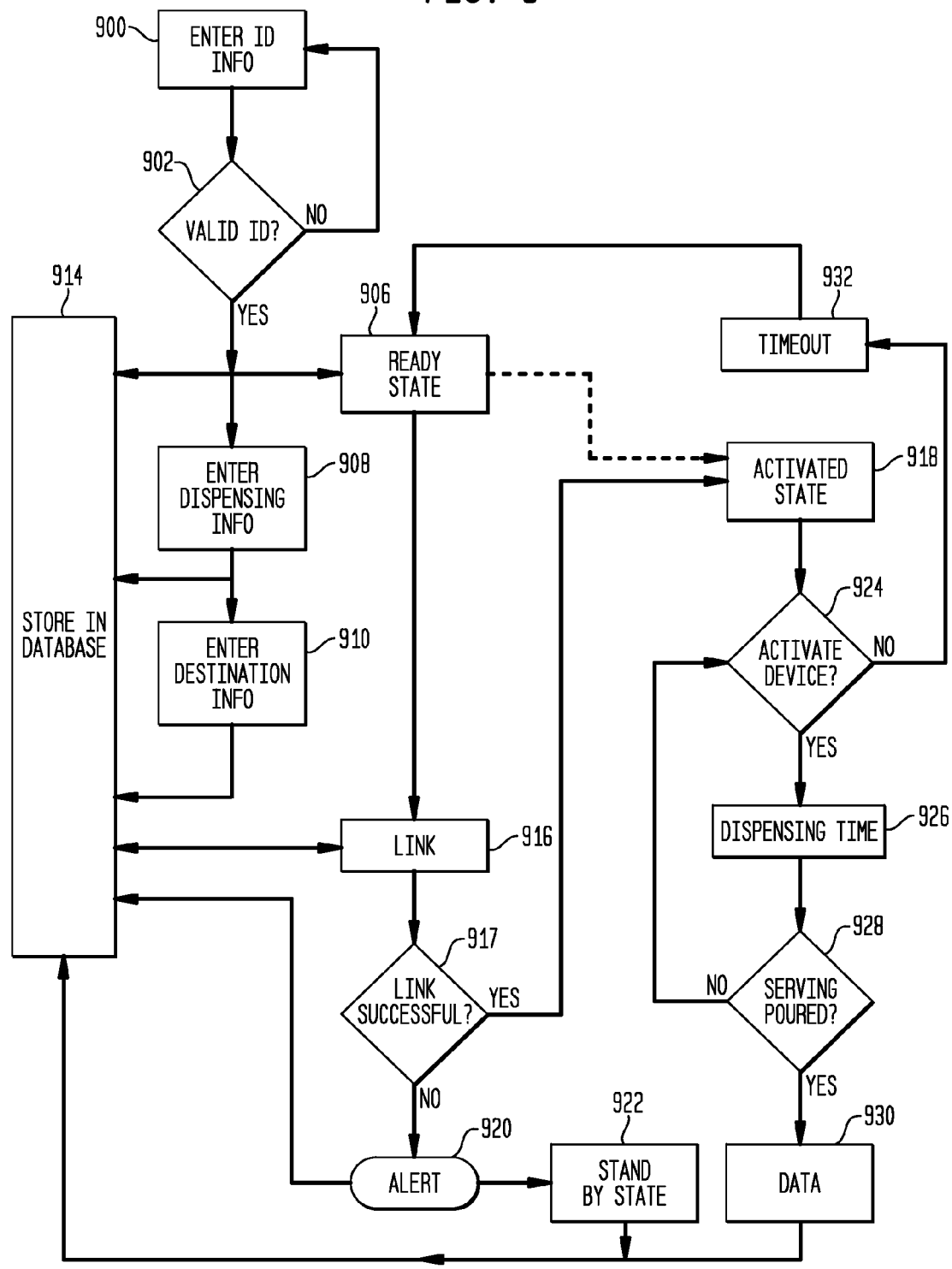

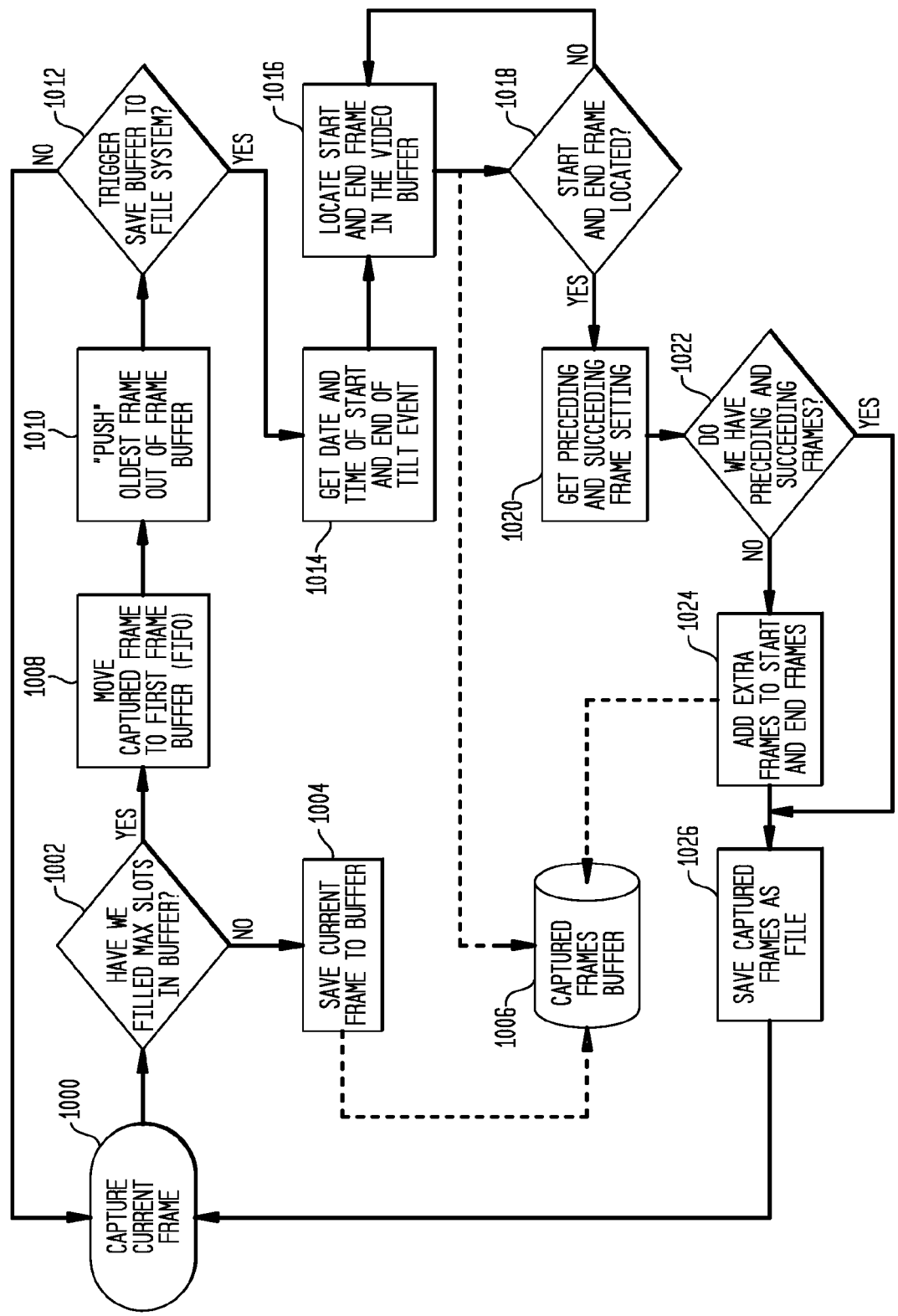

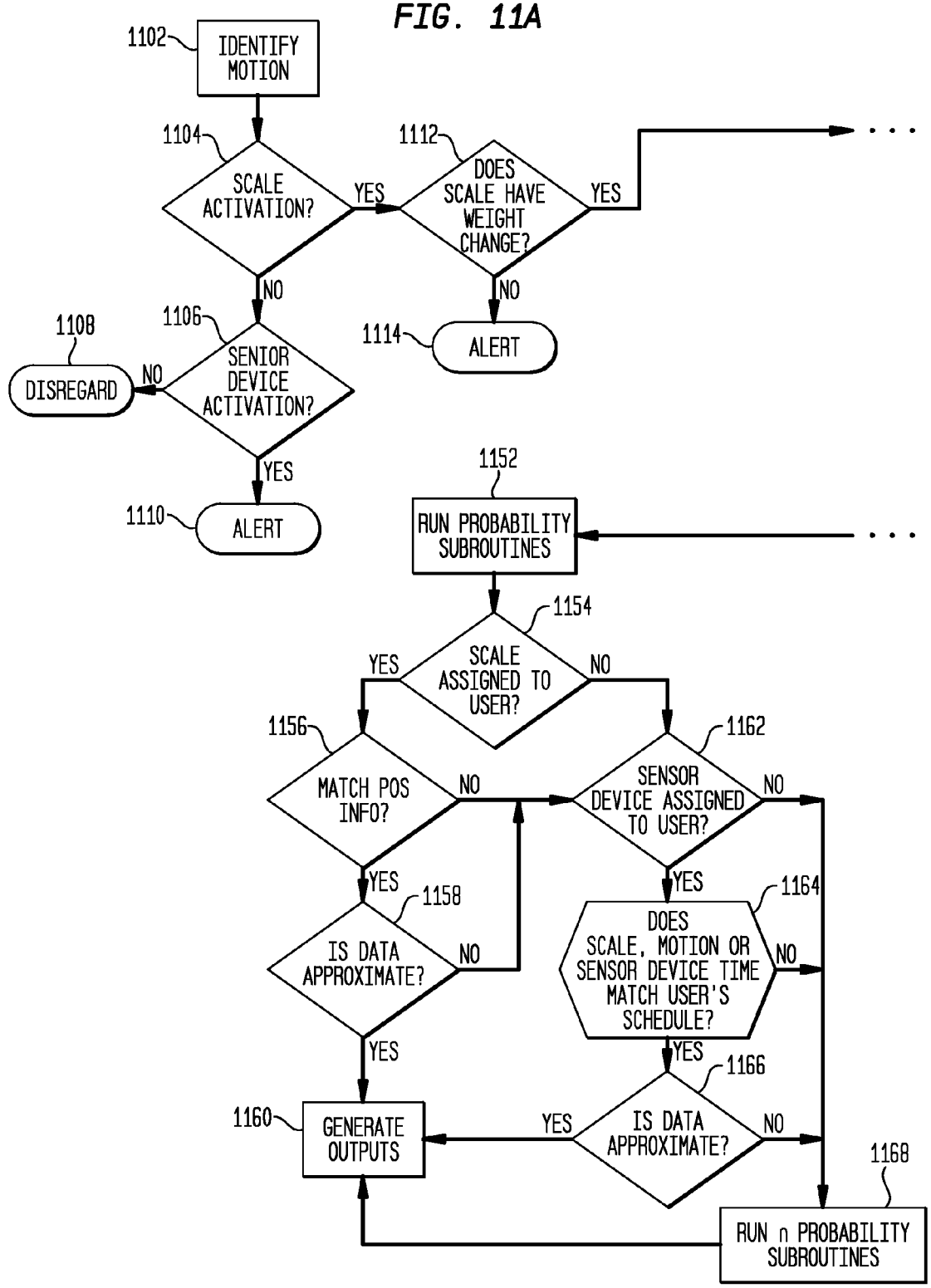

SYSTEM AND METHOD USING A SCALE FOR MONITORING THE DISPENSING OF A BEVERAGE

CROSS-REFERENCE TO RELATED APPLICATIONS

This application is a continuation-in-part of the following co-pending U.S. patent applications. The first application to which the present application is a continuation-in-part thereof is U.S. application Ser. No. 10/243,545, entitled "Service Transaction Monitoring System, Method and Device," filed Sep. 16, 2002, which is a continuation of U.S. application Ser. No. 09/733,719, entitled "Service Transaction Monitoring System, Method and Device," filed Dec. 8, 2000, now U.S. Pat. No. 6,504,481, which claims the priority of U.S. Provisional App. No. 60/169,918, filed on Dec. 10, 1999. The second application to which the present application is a continuation-in-part thereof is U.S. application Ser. No. 09/964,679, entitled "Beverage Dispensing Control System," filed Sep. 28, 2001, which claims the priority of U.S. Provisional App. No. 60/311,366. The entire disclosure and contents of the above applications are hereby incorporated by reference.

BACKGROUND

1. Field of the Invention

The present invention relates generally to the field of systems, methods, and electronic devices used to monitor the dispensing of liquids, in particular, beverages dispensed at establishments.

2. Related Art

Establishments, such as bars, nightclubs, hotels, casinos, and restaurants etc., lose a significant amount of revenue due to pilferage at the point of sale, pilferage of bottles from the bar and storage areas and dispensing of drinks to "buddies." Revenue is also lost due to manual, delayed, and error-prone methods of establishing and keeping data on the number of servings dispensed and quantity of liquid dispensed for each type of beverage metrics such as pouring cost, the cost for each pour of a bottle, pour accuracy, the consistency at which the pour amount matches the paid amount, and inventory values are calculated as infrequently as once a month, or manually on "inventory" day. The task of counting and measuring beverage inventory and calculating pouring costs is time consuming and open to intentional and unintentional errors.

Techniques exist that address some of the described problems for some of the beverages. For instance, multiple serving bottles may be fitted with a control or counting device in the neck of the bottle, or drinks may be dispensed through a gun or other electro/mechanical device. Other techniques include measuring the amount poured prior to serving, or weighing bottles after each serving or at the end of a shift or week. These techniques are typically used in airports and casinos where customer satisfaction takes second place to controls. A disadvantage of these techniques is that each of these techniques require cleaning of the device between uses.

A further disadvantage of existing systems and methods is that these systems have a negative impact on customers and on establishment aesthetics, and are therefore rejected by the vast majority of owners. Thus, most casual and fine dining establishments choose to suffer pilferage and inefficiencies that are endemic to the industry, rather than aggravate their customers with controlled or measured pours and devices, which disturb the ambiance and aesthetics of the point of sale.

SUMMARY

According to a first broad aspect of the present invention, there is provided a method for monitoring the dispensing of a beverage into a container comprising the following steps: measuring a scale time for the container on a scale; measuring a end weight for the container on the scale; and determining that a dispense event has occurred for the beverage based on whether a tilt condition of a dispensing apparatus occurred substantially within the scale time and based on whether the end weight of the beverage dispensed into the container approximates a serving based on point-of-sale information. A tilt condition may be measured by a sensor device attached to the dispensing apparatus, using an RFID or bar code, or using a camera. The determined dispense event may reconcile at least a brand of beverage dispensed with the amount of beverage dispensed. The dispense event and associated data may be transmitted to a local or Internet computer and/or stored in a database.

According to a second broad aspect of the invention, there is provided a method for monitoring the dispensing of a beverage into a container comprising the following steps: measuring a scale time for the container on a scale; and determining that a dispense event has occurred for the beverage based on whether a tilt condition of a dispensing apparatus occurred substantially within the scale time.

According to a third broad aspect of the invention, there is provided a method for monitoring the dispensing of a beverage into a container comprising the following steps: measuring a scale time for the container on a scale; measuring a end weight for the container on the scale; and determining that a dispense event has occurred for the beverage based on whether a sensor measured a tilt condition of a dispensing apparatus substantially within the scale time and based on whether the end weight of the beverage dispensed into the container approximates a serving based on data from the sensor.

According to a fourth broad aspect of the invention, there is provided a method for monitoring the dispensing of a beverage comprising the following steps: (a) measuring a pour time for a dispensing apparatus using a scale; (b) measuring a change in weight for the dispensing apparatus using the scale; and (c) determining of whether a dispense event has occurred for a beverage from the dispensing apparatus based on if a tilt condition occurs substantially within the pour time and based on if the change in weight for the dispensing apparatus approximates a serving based on point-of-sale information.

According to a fifth broad aspect of the invention, there is provided a method for monitoring the dispensing of a beverage comprising the following steps: measuring a pour time for a dispensing apparatus using a scale; and determining of whether a dispense event has occurred for a beverage from the dispensing apparatus based on if a tilt condition occurs substantially within the pour time.

According to a sixth broad aspect of the invention, there is provided a method for monitoring the dispensing of a beverage comprising the following steps: (a) measuring a pour time for a dispensing apparatus using a scale; (b) measuring a change in weight for the dispensing apparatus using the scale; and (c) determining of whether a dispense event has occurred for a beverage from the dispensing apparatus based on if a sensor measured a tilt condition substantially within the pour time and based on if the change in weight for the dispensing apparatus approximates a serving based on data from the sensor.

According to a seventh broad aspect of the invention, there is provided a method of monitoring the dispensing of a beverage comprising the following steps: opening a valve timer connected to a dispensing apparatus by entering point-of-sale information; measuring a scale time for a container on a scale; and determining whether a dispense event has occurred for the beverage from the dispensing apparatus based on if the valve timer is opened substantially within the scale time and based on if the change in weight for the container approximates a serving based on point-of-sale information.

According to a eighth broad aspect of the invention, there is provided a method of monitoring the dispensing of a beverage into a container comprising the following steps: measuring a scale time for the container on a scale; measuring a gradual weight for the container on the scale; and determining that a dispense event has occurred for the beverage based on: whether a tilt condition of a dispensing apparatus occurred substantially within the scale time; identity of the dispensing apparatus; and the gradual weight.

According to a ninth broad aspect of the invention, there is provided a method of monitoring the dispensing of a beverage into a container comprising the following steps: determining whether a tilt condition of a dispensing apparatus has occurred substantially within a scale time; and if a tilt condition has occurred, determining whether a dispense event has occurred based on: identity of the dispensing apparatus; and a gradual weight.

According to a tenth broad aspect of the invention, there is provided a method of monitoring the dispensing of a beverage comprising the following steps: measuring a total weight of a number of dispensing apparatuses weighed at the end of a time period; generating an expected weight from POS recipe data based on recipe information and the number of paid beverages purchased during the time period; and determining that the number of the paid beverages purchased were dispensed by reconciling the total weight with the expected weight.

According to a eleventh broad aspect of the invention, there is provided a method of monitoring the dispensing of a beverage comprising: measuring a time that a change in weight of dispensing apparatus using a scale assigned to a brand occurred; and determining that a dispense event occurred for the beverage based on whether point-of-sale information is entered near the time and the point-of-sale information contains a purchased serving having the brand assigned to the scale.

According to a twelfth broad aspect of the invention, there is provided a method of monitoring the dispensing of a beverage into a container comprising the following steps: (a) measuring a scale time for the container on a scale; (b) determining that selected beverages of a plurality of beverages have been served based on tilt conditions of each of the respective dispensing apparatuses for the selected beverages occurring substantially within the scale time; and (c) determining that a given mixed drink has been sold served based on the selected beverages in step (b).

According to a thirteenth broad aspect of the invention, there is provided a method of monitoring the dispensing of a beverage into a container comprising the following steps: (a) measuring a weight of the container on a scale; (b) sensing a tilt condition of a dispensing apparatus for a brand of beverage; and (c) determining a type of the beverage served based on the weight of the container and the brand of the beverage that was sensed in step (b).

BRIEF DESCRIPTION OF THE DRAWINGS

The invention will be described in conjunction with the accompanying drawings, in which:

FIG. 9 is a flowchart of a process activating a timer valve with point-of-sale information in accordance with one embodiment of the present invention;

FIG. 10 is a flowchart of storing images from a camera in accordance with one embodiment of the present invention;

FIGS. 11A and 11B are flowcharts of a reconciliation method to link data in accordance with one embodiment of the present invention;

DETAILED DESCRIPTION

Figure 1:
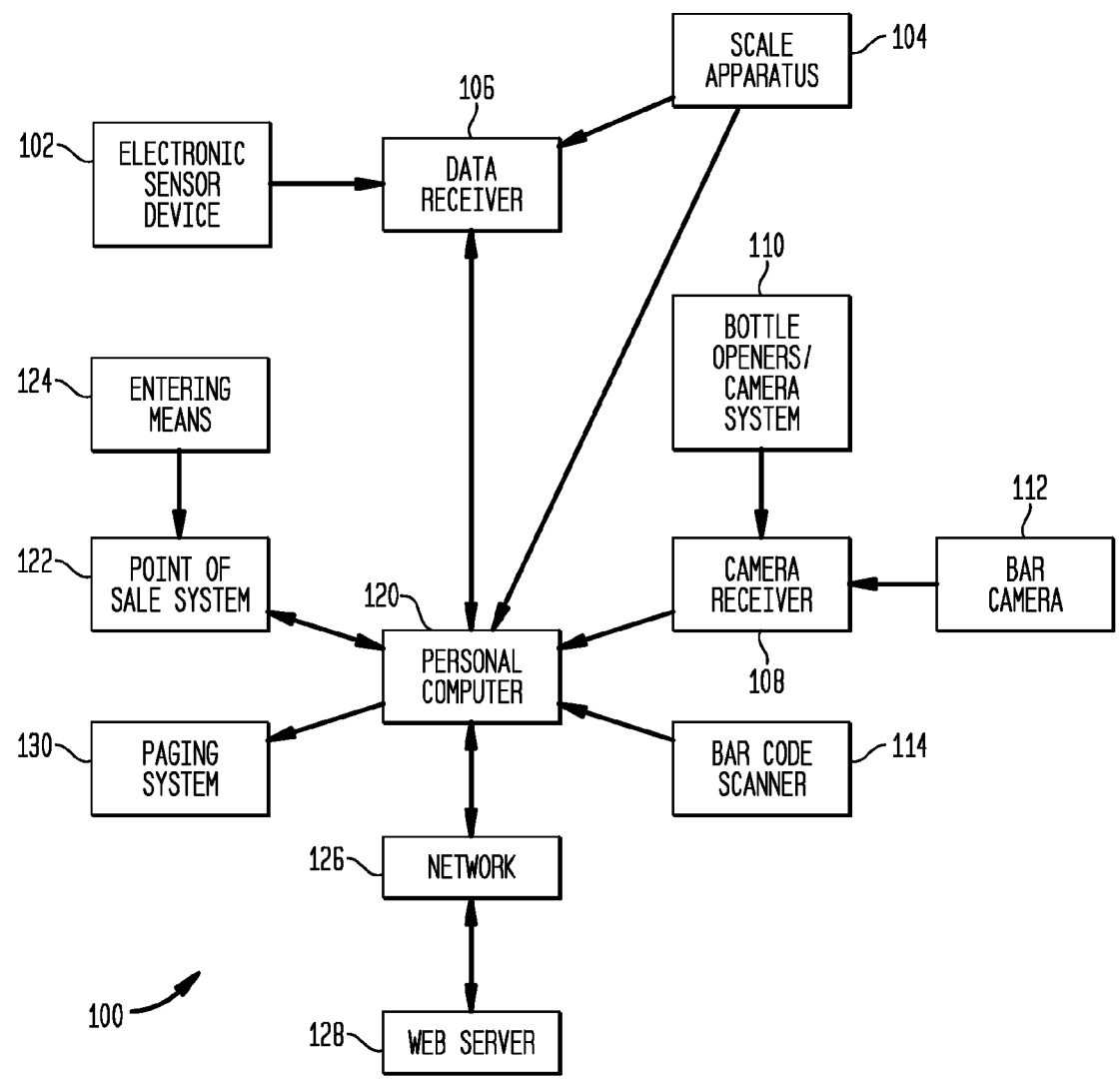
FIG. 1 is a block diagram of the components in accordance with one embodiment of the present invention.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below or throughout the specification, unless specifically indicated otherwise.

For the purposes of the present invention, a step, method or information is "based" on a particular step, method, or information, if that step, method or information is derived by performing a mathematical calculation or logical decision using that step, method, or information. The information may be identification, dispensing or destination information. For example, the dispensing apparatus is placed in a readied state based on the identification information, i.e. the logical condition of accepting valid identification information. An alternative example is linking, matching, reconciling, etc. dispensing information based on destination information, i.e. the logical condition that destination information exists for dispensing information.

For the purposes of the present invention, the term "brand" refers to the identity of the dispensing apparatus or container and to the beverage contained in that dispensing apparatus or container. The brand refers to a trademark, trade name or other identifier of a manufacturer, producer or distributor of the beverage. The type of beverage is different from the brand and refers to the category of beverage, i.e. vodka, rum, whiskey, etc. Each type of beverage may have several different brands of beverage.

For the purposes of the present invention, the term "container" refers to any vessel that may hold a serving to be dispensed. The container may have any type of construction such as a solid, wire, frame, net, etc. construction. The dispensing information or identification information may be printed directly onto the container, as well as attached, affixed, joined, or fastened to part of the container. Examples of containers include the following cups, shot glasses, mugs, glasses, jugs, buckets, baskets, shells, pockets, sleeves, boxes, bins, tanks, etc.

For the purposes of the present invention, the term "destination information" refers to the location of the recipient where a serving and/or bill are to be delivered. Typically, the recipient may be the user or customer who will consume the servings. The destination information preferably links the user, with a server, location, and/or amount of payment. The destination information typically is entered when the user enters the dispensing information and may be changed manually, or automatically assigned. The destination information may be generic or specific. For example, destination information may be entered as table 101A, or may be entered as seat one of table 101A. In the later example, multiple bills for one table may be created for each recipient at the table.

For the purposes of the present invention, the term "dispensing apparatus" refers to devices and containers that may hold a beverage or servings and dispense those servings out through a controlled process, i.e. a valve or opening. A dispensing apparatus may be a coffee urn or bottle. A dispensing apparatus may also dispense other beverages such as juices, teas, sports drinks, water, frozen flavored ice, alcoholic beverages, etc. A dispensing apparatus may also dispense non-beverage liquids such as fuel. A dispensing apparatus may also include non-liquid dispensing servings, such as golf balls, food items, gases, cash, and small game pieces. A dispensing apparatus may be any size, color, shape, etc. and have any number or types of valves. A dispensing apparatus may either be automated or manually operated by a user. A dispensing apparatus may be part of a dispensing system.

For the purposes of the present invention, the term "dispensing container" refers to a free-standing dispensing apparatus. A dispensing container may be a coffee urn, a thermos, a bottle, a jug or a coffee pot. Preferably, a dispensing container may have a means for communicating with a host system, such as a computer and a means for entering data and a means for controlling the spigot or latch needed to open a pour spout. A preferred means for communicating may be via a conventional wireless link.

For the purposes of the present invention, the term "dispensing event" refers to the occurrence of dispensing a serving, such as a beverage, from a dispensing apparatus or container. The events associated with dispensing may be measured so that the serving dispensed may be monitored, tracked, and reconciled with other data.

For the purposes of the present invention, the term "dispensing information" refers to a variety of data inquiries that the user enters to create the desired serving. Typically, a user or server may enter the dispensing information using a keypad, keyboard, a user-controlled interface, voice activated input device, stylus pad or touch screen. A user or server may also enter the dispensing information by scanning, or entering, a bar code or magnetic strip wherein the information is contained. The dispensing information may require a user to enter the quantity of serving to be dispensed. Additionally, the dispensing information may require a user to enter the number of servings to be dispensed. This dispensing information is important to prevent mistake or fraud in having a user receive an unpaid serving that is mistakenly entered as refill servings. The dispensing information may include where the serving is to be dispensed, i.e. which dispensing apparatus is to dispense the serving when activated by the identification medium. This dispensing information is important when a multi-dispensing apparatus is in use within a single business or shopping area or when a dispensing apparatus has several valves. The dispensing information may also include destination information, including location, which may be used to link a dispensing serving to a bill. The dispensing information may also enter the amount and method of payment. The payment may be in the form of a cash transfer, credit or debt charge. In a preferred embodiment of the present invention, if the amount of payment is not entered as dispensing information, the identification information will not activate the dispensing apparatus from a readied state.

For the purposes of the present invention, the term "gradual" refers to the slope of the weight increase over time that is smaller than 2 over the period, but is greater than a slope of zero. The gradual increase may be non-uniform or non-linear, but for the period would be gradual. A "gradual weight" is a measurement that was recorded having a gradual change in weight over a measured period. Gradual weights may exclude spikes or rapid increases that exceed the gradual slope. A gradual weight ends when the weight increase has a slope closer to zero for a period of time. This is referred to as an "end weight." Examples of gradual slopes are shown in FIGS. 14A-14D. Embodiments of the present invention may use weight measurements or end weights associated with gradual increases that approximates the amount of serving entered with point-of-sale information.

For the purposes of the present invention, the term "identification information" refers to information that identifies a particular user, which may be contained, encoded, stored, etc. in, for example, a driver's license, credit card, bar code, magnetic strip, or bio-sensing device, or may be entered, retrieved, or accessed using a PIN, password, code, etc. The identification information may also be contained on a cell phone, lab top computer, PDA, etc. that would communicate with a host system via a wireless communication link. The identification information puts the dispensing apparatus in a ready state or activates the dispensing apparatus when the identification information is read, scanned, or entered. The identification information may be issued by the business or owners of the dispensing apparatus to the user, or the identification information may be the user's personal item that is fitted, encoded, programmed, etc. to be used for the dispensing apparatus. The identification information may be particularly useful when a user is not the consumer of the serving, but instead is delivering the serving to where a user is located.

Preferably, the dispensing apparatus may not be activated or put in the activated state until the identification information is read, entered, or activated.

For the purposes of the present invention, the term "multi-dispensing apparatus" refers to dispensing apparatus that consists of more than one dispensing apparatus. A preferred multi-dispensing apparatus may have more than one valve, such as the multiple valves typically used to dispense several beverages. A preferred dispensing apparatus is a beverage stand, such as those typically found in restaurants, for dispensing soft drinks.

For the purposes of the present invention, the terms "POS information" or "point-of-sale information" describe the data that reflects a transaction or an exchange of goods and services for money. In a restaurant or bar establishment, a typical POS transaction involves providing a customer with goods and services to be consumed and collecting payment for the goods and services before the customer leaves the restaurant. Entering POS information consists of entering of events corresponding to the transfer of goods or services, i.e. entering drinks or food ordered, destination of goods, and serving amount, which can be used to generate a bill for the customer to pay. A waiter in an establishment may record several POS data points over a period of time before a bill is generated to complete the POS transaction. POS information may also include the serving, dispensing information relating to the serving, destination information of where the serving is to be delivered and identification information of the waiter.

For the purposes of the present invention, the term "POS recipe data" or "recipe database" refers to recipe information and the purchased paid beverages. The recipe information contains the information related components of beverage: the type of beverage or type and brand of beverage, and the amount to make each purchased paid beverage. For example, the recipe information may contain the following components to make a Black Russian: 1.0 oz Vodka and 0.5 oz Chocolate Liquor. Recipe information is typically entered before any dispensing and may be update to accommodate new drinks or changes to a drink. The waiter enters on the POS enter device that one Black Russian is a purchased and the system records a paid beverage.

For the purposes of the present invention, the term "pour time" refers to the difference in time between two weight measurements of the dispensing apparatus plus beverage. The pour time may include the time dispensing apparatus is being measured.

For the purposes of the present invention, the term "scale time" refers to the duration a container or similar device has been placed on a scale. Typically, during the scale time the scale will measure a change in weight for the container. The scale time begins when the container is placed on a scale and may end once a container is removed, whether filled or unfilled. During the scale time, a dispensing event may occur in which a beverage may be poured into the container. Also, during the scale time a scale may be adjusted, tared, or zeroed.

For the purposes of the present invention, the term "serving" refers to the allocation of a dispensed product purchased by the user in a certain quantity and/or number. For example, in a purchase for two twelve-ounce soft drinks by the user would result in the following: the serving would be twelve ounces in quantity and two soft drinks in number. In addition, the brand of the beverage may also be identified by the serving. Dispensed servings may be fungible goods that are solids, liquids, gases, etc. and combinations thereof. Examples of solid servings include, but are not limited to: coins, sport balls, candies, chips, game pieces, ice cream, office supplies, audio and video recordings, etc. Examples of liquid servings include, but are not limited to: soft drinks, coffee, juice, teas, sports drinks, frozen flavored ice, alcoholic beverages, liquors, wines, beers, fuel, etc. Examples of gaseous servings include gases by themselves, such as air, oxygen, helium, or in combination with other servings, such as carbonation with a soft drink. In a preferred embodiment, a serving may refer to a liquid consumable beverage such as beer or liquor.

For the purposes of the present invention, the term "weight profile" refers to the change in weight over a measured time period. The changes in weight may be due to a container being placed on a scale, the dispensing of a beverage into the container, placing ice, fruit, or other garnish into a container. Using a weight profile, embodiments of the present invention may measure scale time and the gradual changes of weight. In some embodiments the weight on the scale may by a dispensing apparatus containing a beverage. In such embodiments the weight profile is the difference between two measurements made on the scale.

Description

The present invention is generally directed to a system and method for monitoring the dispensing a beverage from a dispensing apparatus. The various embodiments of monitoring determine that a dispense event has occurred using data from a scale and data from at least one other device. The other device may be a tilt sensor, motion sensor, camera, RFID, bar code, POS device, recipe database or any combination of these devices. Embodiments of the present invention may use the scale to provide a real time indication of weight to the user, along with an accurate weight measurement to be correlated with the other data. The term correlate is intended to mean a process for finding a mutual relationship between two or more points of data. The terms correlate, reconcile, match, and correspond may be used interchangeably throughout this application.

These embodiments may provide managers and owners of establishments with an efficient tracking system of beverage inventory. In one embodiment, the present invention may be used to monitor the dispensing of a beverage from a dispensing apparatus or dispensing container by measuring a weight change and tilt of a sensor device attached to the dispensing apparatus. In some embodiments the dispensing apparatus may also have a bar code or RFID that is detected during the tilt condition. By using this information, along with a serving entered with point-of-sale information, embodiments of the present invention may be able to determine that a dispense event occurred by matching which beverage came from which dispensing apparatus. Further matching may also include matching who, i.e. which bartender, dispensed the beverage. Further when a serving is entered with point-of-sale information, reconciliation may also involve approximating a measured weight change with the serving size. Further, some embodiments of the present invention may also use images or video from a camera to record the dispensing event. In some embodiments, the reconciliation of data from independent components provides for a monitoring system which does not directly control the amount of a pour.

Using the scale, methods of the present invention may measure the weight increase of a container on the scale, the difference in weight between two or more dispensing apparatus, or the weight of the container. In some embodiments, the scale may measure multiple weight increases for the same container from different dispensing apparatus. Such weight information, along with the time that the weighing occurred may be used in combination with sensors that track a tilt or motion, POS information, a recipe database, or combinations thereof.

In some embodiments the tilt condition may be measured by a sensor, such as a tilt sensor or motion sensor. The tilt sensor is housed in a device that is attached to the dispensing apparatus in a manner which does not block or contact the beverage being dispensed. In such embodiments the tilt sensor and the housing lacks a valve that is operated in response to a command or mechanical action. A valveless tilt sensor does not obstruct the passage of beverage from the dispensing apparatus and thus does not require cleaning between uses. Also, a valveless tilt sensor does not impact the ambiance and aesthetics of the establishment, while providing managers and owners of establishments with an efficient tracking system of beverage inventory.

In embodiments which use a tilt sensor, the sensor data may be used to correlate with the weight data. Sensor data may be obtained using a tilt sensor as described in U.S. Pat. No. 6,504,481, the entire contents and disclosures of which is incorporated herein by reference. Sensor data may determine the pour rate, also called flow rate, is calculated in units of volume per second, for a particular bottle of a particular size and brand which has been emptied. The brand of the beverage is relevant because different kinds of beverages have different viscosities and, hence, different pour rates. The size of the bottle also may affect the rate of pour. For example, a one liter bottle of Absolut vodka may have a different pour rate than a 750 ml. bottle of Absolut vodka. In addition, pour rates for the same brand and bottle size may vary from bar to bar, depending on whether, and what type of, pourers are used. The total time required to empty the bottle has been recorded for this particular bottle and is contained in a database. The pour rate is the volume of the bottle divided by the total time required to empty the bottle. A particular amount may be determined by dividing the time of the dispensing event by the pour rate. The volume obtained from the sensor data may be used to correlate with the weight data obtained from the scale. One advantage of using the tilt sensor in such a manner is that the POS information is not necessary in determining that a dispense event has occurred.

In alternative embodiments, the method may be used with a valve system in which a valve timer may be activated and opened in response to receiving at least some point-of-sale information. In such embodiments, the point-of-sale information requires at least identification information, dispensing information and dispensing information. Thus, each dispensing event from the valve is linked with information relating to who poured the beverage, the amount of the beverage poured and where the beverage was delivered. Further, when using a scale, the weight measured by the scale may be checked against the amount of the beverage entered with dispensing information. Such embodiments may provide managers and owners of establishments with an efficient tracking system of beverage inventory.

Embodiments of the present invention may be able to correlate information related to a dispensing event and obtained or measured by a camera, tilt sensor, POS entry device, and/or scale, with the brand of the beverage dispensed. The brand is the trademark, trade name or other identifier of the dispensing container, such as Absolute™ Vodka, SKYY™ Vodka, Van HOO™ Vodka or Grey Goose™ Vodka. Each dispensing apparatus contains one brand of beverage which determines the price of the beverage, which may vary widely from one brand to another. The brand may be determined by reconciling a dispensing apparatus with a scale, assigned to a brand. Also, the brand may be determined by a user which enters the brand with the POS information using an entry device, such as a keyboard, keypad, voice-entry device, stylus, touchpad, etc.

The brand of the beverage may be stored in a database, such as a recipe database. The brand of the beverage may be identified and stored through a unique ID that is assigned to a dispensing apparatus. The unique ID may be alphanumerical characters stored in the sensor device attached to the dispensing apparatus. When, for example, data is sent from the sensor device after the completion of a tilt condition, the unique ID may be included.

Prior techniques employed a scale to weigh bottles and measure the weight of beverages. Typically such prior techniques involve manually scanning a bar code label on the dispensing apparatus and then measuring the weight which is recorded for inventory purposes. Such prior techniques manually link the dispensing apparatus with the weight by entering the both data in the same entry in a database. Some techniques weigh dispensing apparatus at the start and end of business hours or regularly, such as once a week. Other prior techniques measure a batch weight for a category of beverage type comprising several bottles may be measured at once. Some prior techniques used a continuous weighing technique for a dispensing apparatus to determine the amount of an overpour. Typically these prior techniques require one to enter data along with the weight measurement in advance of dispensing the beverage to a customer. Embodiments of the present invention are an improvement of these prior weighing techniques and allow a user during a dispensing event to measure a weight without having to manually link the beverage being dispensed. Such advantages of the present invention may allow a user to use a scale for measuring a beverage while serving a customer.

Embodiments of the present invention are able to provide a service transaction and monitoring system that can efficiently record beverage sales and payment activity without directly controlling or measuring the drink served and without impacting the aesthetic of the establishment. To accomplish such goals, embodiments of the present invention may obtain data from independent components of a system and may reconcile the obtained data to determine the type of brand of beverage dispensed. In addition, various embodiments of the present invention provide a system and method that automatically calculates pouring costs, pour accuracy, and inventory values at the end of each shift so that there is immediate, accurate accountability and continuous metrics for management. Such inventory tracking may provide management an efficient and reliable method to arbitrate dispensaries or disputes in sales activity on a per event basis. Embodiments also provide a system and method to alerts employees, waiters, bartenders, or managers to anomalies in real-time so that such person may correct the error on the spot. Embodiments further provide a common user interface and reporting functions suitable for various disciplines needed to monitor and manage the beverage inventory and sales business regardless of the type of container to which the beverages are dispensed.

In addition, embodiments of the present invention may determine the dispensing event occurred and based on that dispense event the method may discern the brand of beverage dispensed with the weight of that beverage. The brand of beverage may be determined by the unique ID assigned to the dispensing apparatus. The weight of the beverage dispensed into a container may be measured by the scale as a gradual weight, excluding all rapid increases of weight. The end weight obtained once the gradual weight stabilizes may be used in the calculation. In other embodiments, when a dispensing apparatus is placed on the scale, a difference in weight between two or more measurements may determine the weight of the beverage dispensed. Embodiments may be able to match the unique ID brand identifier of the dispensing apparatus with the scale measurement using the time and duration measured by the tilt sensor and scale. Further, when the scale has a unique ID and that unique ID is assigned to a user, embodiments of the present invention may determine who poured, which brand and the exact amount, without requiring the user to re-enter the data with each dispense event.

Other embodiments of the present invention may measure multiple tilt conditions of different dispensing apparatus that occurred substantially during the same scale time. For example, a bartender may wish to make a mixed drink, i.e. a cocktail, using several different types of beverages. A container is placed on the scale and a first type of beverage is added, then a second, and finally a third. In the system, there may be three tilt conditions that all occurred within the same scale time. Using such information, the system or method may look up which recipe in the recipe database contains all three different types of beverages. To further refine the lookup, the amount of each beverage can also be used in looking up the recipe. In addition, the lookup may also be refined by using the brand for each type of beverage. Such an embodiment tracks the combination of brands of beverages poured into the same glass to determine the recipe.

Other embodiments of the present invention may use the weight of the container in determining which beverage was dispensed. Different containers are used in different types of mixed drinks. The recipe for the mixed drink calls for a particular size container. Using the weight of the container and the brands of beverages determined to have occurred during the dispense event, such embodiments may be able to determine which type of beverage was dispensed. For example, the scale may measure a weight of a container, $W_{cont}$, and the dispensing of two dispensing apparatus during the dispense event. Using the recipe database, such embodiments are able to determine which type of recipe would use that $W_{cont}$ in combination with the two type of dispensing apparatuses.

While the embodiments of the present invention are described in terms of dispensing alcoholic beverages, it should be understood to those skilled in the art that the present invention may be used with any type of beverage. Further, it should be understood to those skilled in the art that the present invention that the embodiments of the present invention are also suitable to monitoring the dispensing of other types of servings.

FIG. 1 is a block diagram that shows the components of an exemplary service transaction monitoring system 100 in accordance with one embodiment of the present invention. System 100 preferably includes electronic sensor device 102, scale 104, data receiver 106, camera receiver 108, which is connected to a bottle opener/camera system 110 and/or bar camera 112, bar code scanner 114, personal computer 120, point of sale (POS) system 122, entering means 124, network 126, Web server 128, and paging system 130. Although system 100 shown in FIG. 1 includes each of these components, in other embodiments a system may include fewer components, such as sensor device 102, scale 104, data receiver 106, and personal computer 120.

In addition, other embodiments of the present invention may have a different configuration of components, such as bar code scanner 114 is part of scale apparatus 104, or electronic sensor device 102 send data directly to Web server 128. In one embodiment, data receiver 106 and camera receiver 108 may directly with network 126 and Web server 128 without first communicating through computer 120. In such embodiments Web server 128 may perform various correlation methods as described throughout this application.

Sensor device 102 may be a motion or tilt sensor and may be attached to a dispensing apparatus. Electronic sensor device 102 may detect the dispensing of beverages and record information about dispensing events. In addition, scale 104 may weigh the container that receives the beverage or the dispensing apparatus that dispenses the beverage. Sensor device 102 detects the dispensing of beverages from multiple-serving dispensing apparatus, such as bottles of wine, liquor, and drink mixes, including the free pouring of such drinks, and dispensing from kegs, and other types of dispensing apparatuses. Camera receiver 108 may also detect the dispensing event using a bottle opener/camera system 110 that detects the dispensing of beverages from single-serving dispensing apparatuses, such as bottles of beer or soft drinks. Bar camera 112 records information about dispensing events and other related events.

Examples of free pouring of drinks include: pouring a drink from a multiple-serving dispensing apparatus without directly measuring, controlling, or affecting the drink size through devices such as guns, nozzles, pourers, or measuring glasses.

Dispensing event information from sensor device 102 and scale 104 is transmitted to data receiver 106 and then to personal computer 120. Alternatively, sensor device 102 and/or scale 104 may transmit the information directly to personal computer 120. Dispensing event information from bottle opener/camera system 110 and bar camera 112 may be transmitted to camera receiver 108 or directly to personal computer 120.

A user/waiter/bartender may enter identification, dispensing and destination information through entering means 124, i.e. keyboard, keypad, touch pad, magnetic swipe card, etc. Entering means 124 may be a separate component from sensor device 102 or scale 104, or may be integrated with any of the components shown in FIG. 1. Entering means 124 may input the point-of-sale information at the point of sale system 122. Point of sale system 122 also records payment and other information for the beverages dispensed, transmits the information to personal computer 120. Personal computer 120 contains databases for storing dispensing event information (tilt data and scale data), point-of-sale information, payment information, as well as recipes for drinks, the identifiers and status of sensor device 102, images of bottle cap labels, inventory, and personnel information. Personal computer 120 also contains application software, through which it processes the dispensing event information and the payment information. Processing may include the reconciliation of dispensing events, scale information, camera information, point-of-sale information and/or register ring-ups, as well as the tracking or accounting of dispensing events which cannot be reconciled, etc. Personal computer 120 may communicate alerts, errors and problems to management personnel or others through paging system 130. Paging system 130 may be a cell phone, pager, hand held device, barcode reader, personal digital assistant (PDA), watch, computer, etc. Personal computer 120 may communicate with Web server 128 over network 126.

In some embodiments sensor device 102 that communicates directly with Web server 128 over network 126 using an embedded processor. The embedded processor receives data from sensor device 102, as well as scale 104, entering means 124, and cameras 110 and 112, and packages the data for transfer over network 126 using, for example, TCP/IP protocols. The communication may be through a wireless or wired link or a combination of various networks. The embedded processor may comprise a memory buffer, a rechargeable battery and built in battery back up. The embedded processor may be independently used to send data to Web server 128 at a later time. In the event of a power communication failure, the embedded processor may store data and reestablish a connection. In such embodiments, Web server 128 may contain a computer for performing the reconciliation and processing of data sent from the embedded processor. In addition, Web server 128 may have databases for storing the data. Embodiments that use an embedded processor may be able to reduce or eliminate on-site personal computers, databases, and application software and thereby may be able to avoid conflict issues.

Personal computer 120 may be a local personal computer, PDA, cell phone, or other portable electronic device. Personal computer 120 receives information from all the devices, including for example scale 104, sensor 102 and POS entering means 124, in the system and stores the information in the database.

In a system of the present invention there may be multiple devices within the same establishment. For example, a bar may have seven scales, forty sensors and two POS entering means. The information from each of the devices may be sent to one personal computer which communicates with several remote web servers. Embodiments of the present invention are envisaged to be scalable so that additional devices may be added as necessary.

A user, such as an owner or manager, can apply scale 104 alone or scale 104 with sensor device 102 or RFID tags, bar codes, etc., in various operationally convenient to the management of the establishment. In embodiments, the manager may use scale 104 and sensor device 102 to measure every pour. Sometimes camera 110 may be used to capture dispensing events from certain types of brands. Also, for example a manager may only require one brand of bottles to be weighed if that is the only brand which is causing overage problems. In other examples, the manager may use sensor devices 102 that are contactless, i.e. does not contact the liquid, for certain brands and sensor devices 102 that are pour spouts on other brands. Also, for example the manager may require only one of many bartenders to use the system, perhaps only for one brand. The system of the present invention may be used by the manager only for training or sporadically for audits. The various uses of embodiments of the present invention are not to be considered as limiting the scope of the present invention.

Various devices of the present invention may record different times and durations. The time refers to the time of day an event occurred. For synchronization purposes the time may be linked to a standard time reference or an external clock. Duration is how long an event occurs and may be measured using a standard time reference. For purposes of the present invention, a common time reference is sufficient.

Each of the functions identified in FIG. 1 related to the embodiments of the present invention will now be described in more detail.

Figure 2:
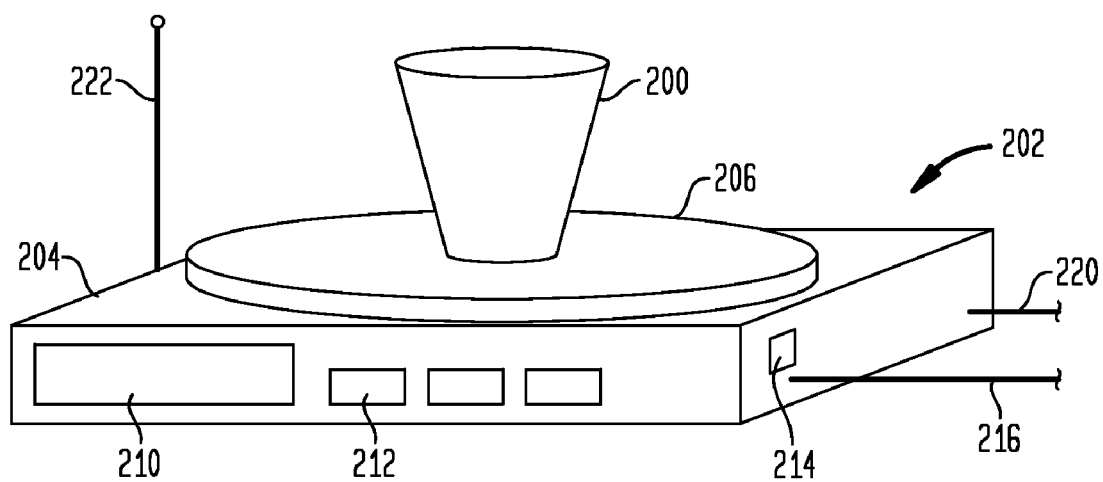
FIG. 2 is a schematic drawing of scale having a container placed upon the scale in accordance with one embodiment of the present invention.

FIG. 2 shows a container 200 placed upon an exemplary scale 202, in accordance with an embodiment of the present invention. Scale 202 comprises a housing 204 and weight sensing pad 206, upon which the container 200 rests. On one side of the housing 204 there is a display 210 for providing a visual indication of the weight along with measurement units, and several function buttons 212. Power may be supplied through an external source through power cord 216 or through an internal source by using batteries (not shown). Function buttons 212 may include a button to tare or zero scale 202, a button to change units, a button to calibrate, and/or a button to select mode. Inside housing 204 there may be a conventional weighing means, such as a beam/fulcrum, a strain gauge transducer or standard load cell technology, and a processor to record the weight and send the data to display 210 and to a remote location either through a wire networked connection 220 or wirelessly through an antenna 222. Alternatively, antenna 222 may be an internal antenna that operates over a wireless connection. Scale 202 may be assigned to a specific user and that assignment may be stored as data in scale or a computer used in processing the data.

In embodiments of the present invention the visual indication may be a digital output on display 210. Display 210 may indicate other information such as the start up messages or test when the power is turned on using switch 214, an error due to an overload, or instability indication. On display 210, the brand name of the serving, amount of serving, user's identification, destination information, or other point-of-sale information may be displayed. Further display 210 may display the ingredients for a particular recipe that tracks the ingredients. For example, if a sensor is attached to a bottle of vodka having the brand name GREY GOOSE, then display 210 may read: GREY GOOSE—1.02 oz.

It should be understood to those skilled in the art that the present invention may be use any type of scale suitable to measuring a weight and sending the weight data to another database or computer. Examples of suitable scales are described and shown in U.S. Pat. Nos. 5,387,766 and 4,961,533, the entire contents and disclosures of which is incorporated herein by reference. Further, the exemplary scale shown in FIG. 2 may be modified to incorporate additional functions and features as necessary. For example, one desirable function may be to include a camera for taking images and videos of the dispensing event on or near the scale. Also an entry device for point-of-sale information may be combined with a scale. The camera may be an integral part of the scale or may be separate system that is fixed in a desired position or a handheld camera.

In some embodiments of the present invention, the container may be a shaking or mixing device, such as a shaker or jigger, used to measure the volume of the poured beverage. Once the volume is measured, the shaker or jigger also may act as a quasi-dispensing apparatus and dispenses the volume in the shaker or jigger into a second container, i.e. glass. The shaker or jigger may also have a tilt sensor that is attached or built into the shaker or jigger for measuring motion.

Figure 3A:
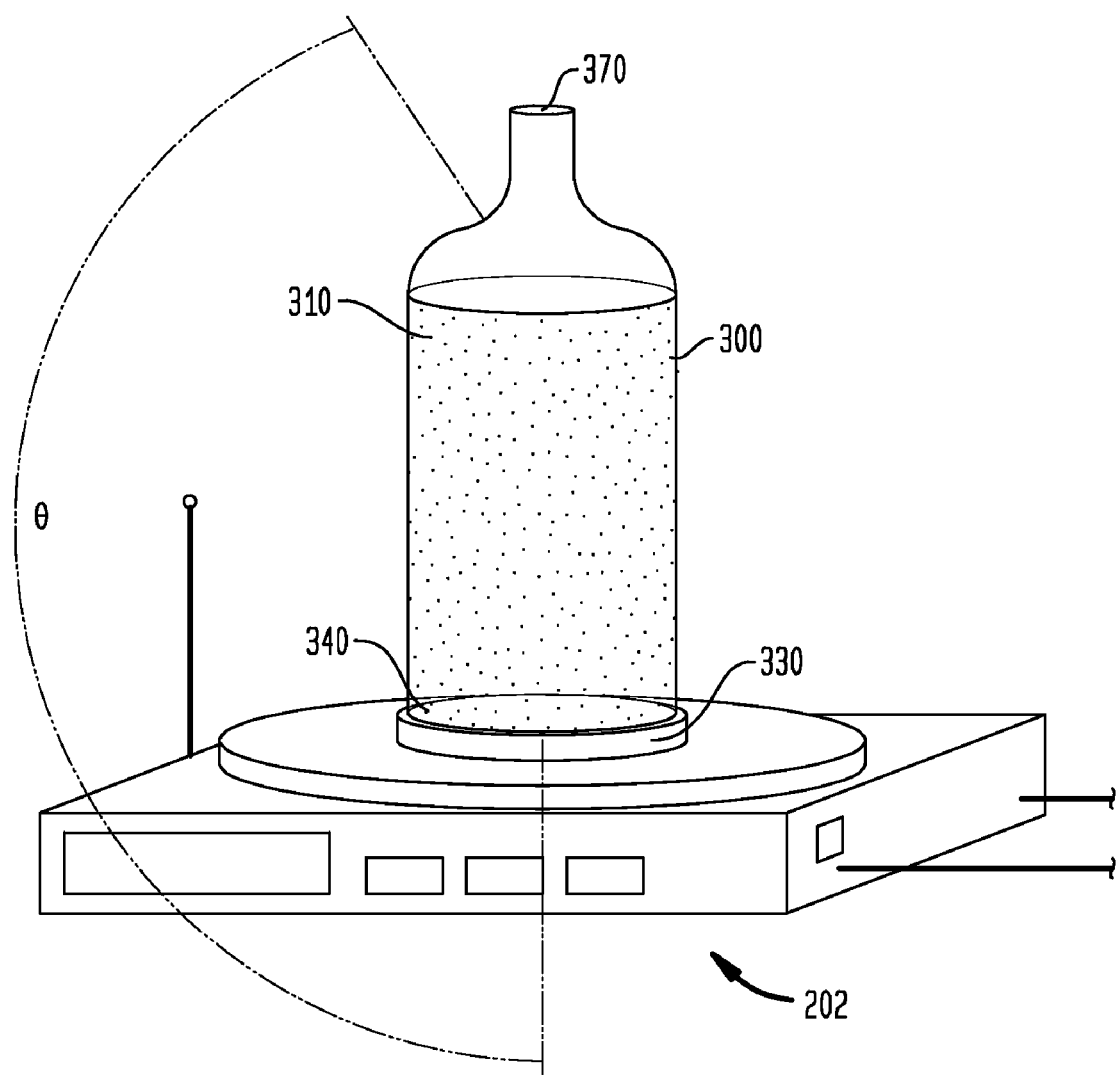
FIG. 3A is a schematic drawing of a dispensing apparatus having a sensor device on the base in accordance with one embodiment of the present invention.
Figure 3B:
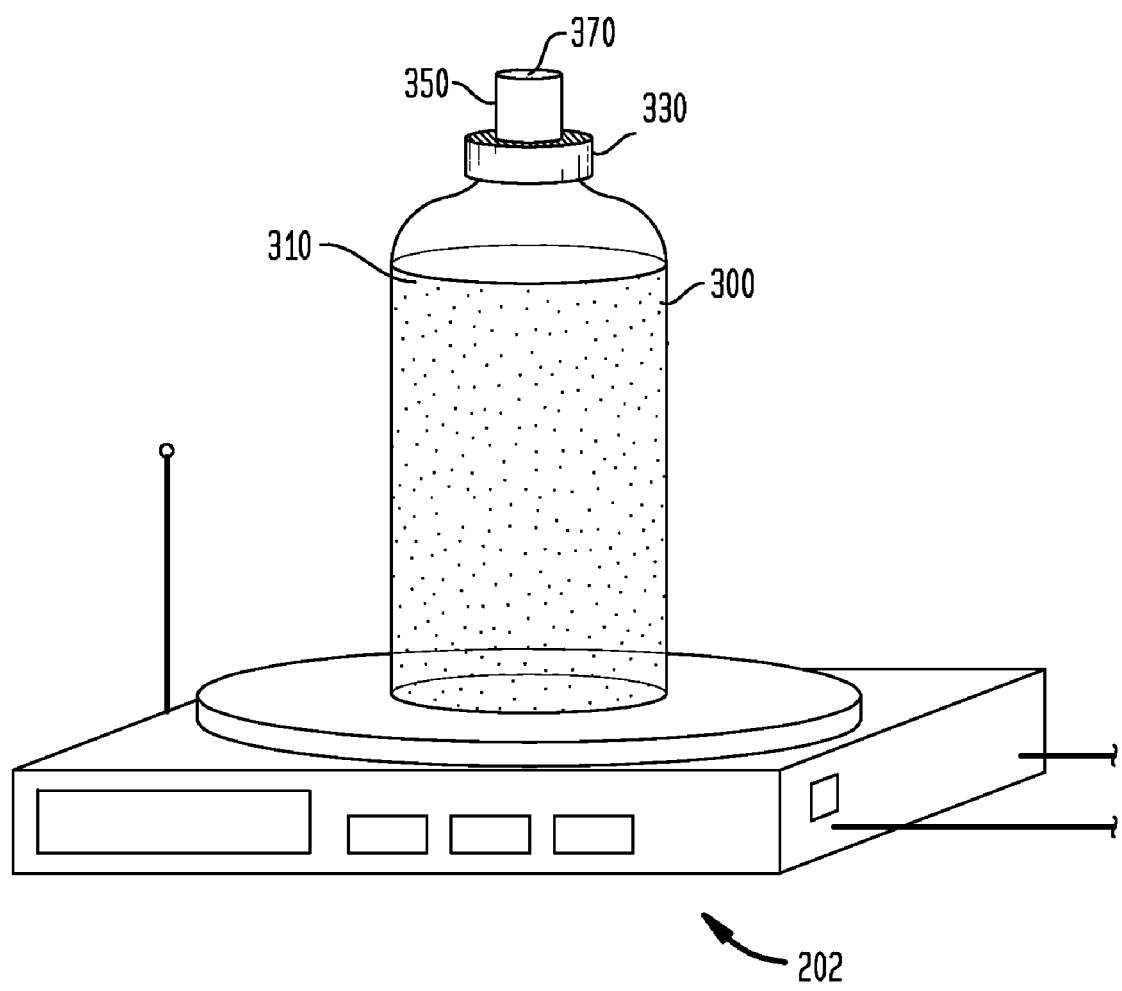
FIG. 3B is a schematic drawing of a dispensing apparatus having a sensor device on the neck in accordance with one embodiment of the present invention.
Figure 3C:
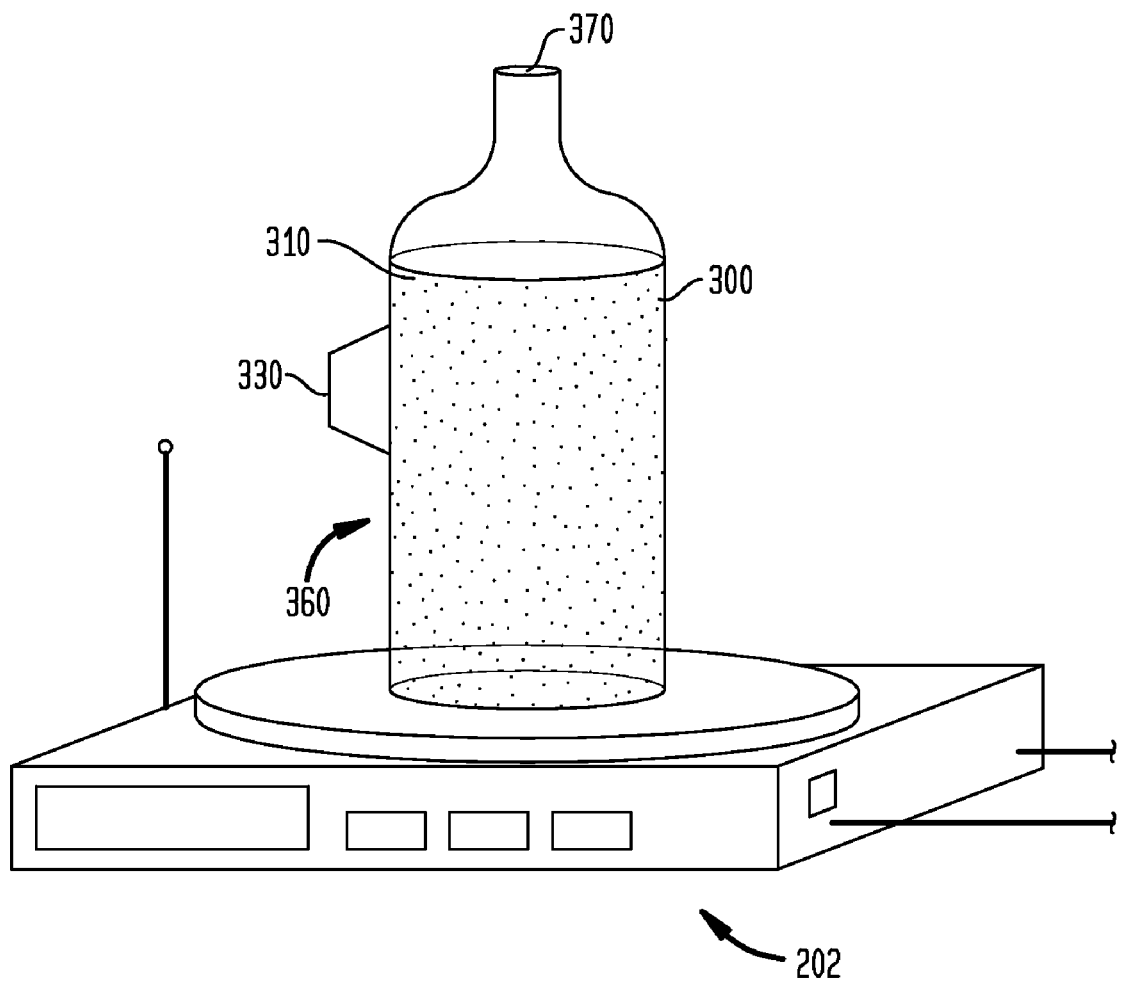
FIG. 3C is a schematic drawing of a dispensing apparatus having a sensor device on the side in accordance with one embodiment of the present invention.

FIGS. 3A, 3B and 3C show a dispensing apparatus 300 in accordance with an embodiment of the present invention. Dispensing apparatus 300 contains a beverage 310 and is placed upon scale 202, as shown in FIG. 2 and described above. Dispensing apparatus 300 has an attached sensor device 330 which is shown on the base 340 of dispensing apparatus 300 in FIG. 3A, on the neck 350 of dispensing apparatus 300 in FIG. 3B and on the side 360 of dispensing apparatus 300 in FIG. 3C. Sensor device 330 is an electronic device that may sense or detect a motion or tilt. Sensor device 330 may also record such motion or tilt activity and transmit the data relating to the motion or tilt to a remote receiver, database, or computer. The placement of sensor device 330 in accordance with one embodiment is such that it does not block, obstruct or contact beverage 310 that is poured or dispensed out of opening 370 of dispensing apparatus 300. For example, to pour beverage 310 from dispensing apparatus 300 one may tilt dispensing apparatus 300 at an angle θ of approximately 20° to 180°. Even though in many situations one must achieve a threshold of angle of approximately 20° to begin pouring, the tilt occurs when the angle exceeds zero. When pouring occurs beverage 310 flows from opening 370 and into a receiving container without contacting sensor device 300. Additional placements may be made depending on the contours, shapes and designs of dispensing apparatus 300. An advantage of such embodiments is that sensor device 330 may be used interchangeably and repeatedly without having to be cleaned and maintained, as often is required with a control valve or gun-type mechanism.

Figure 4A:
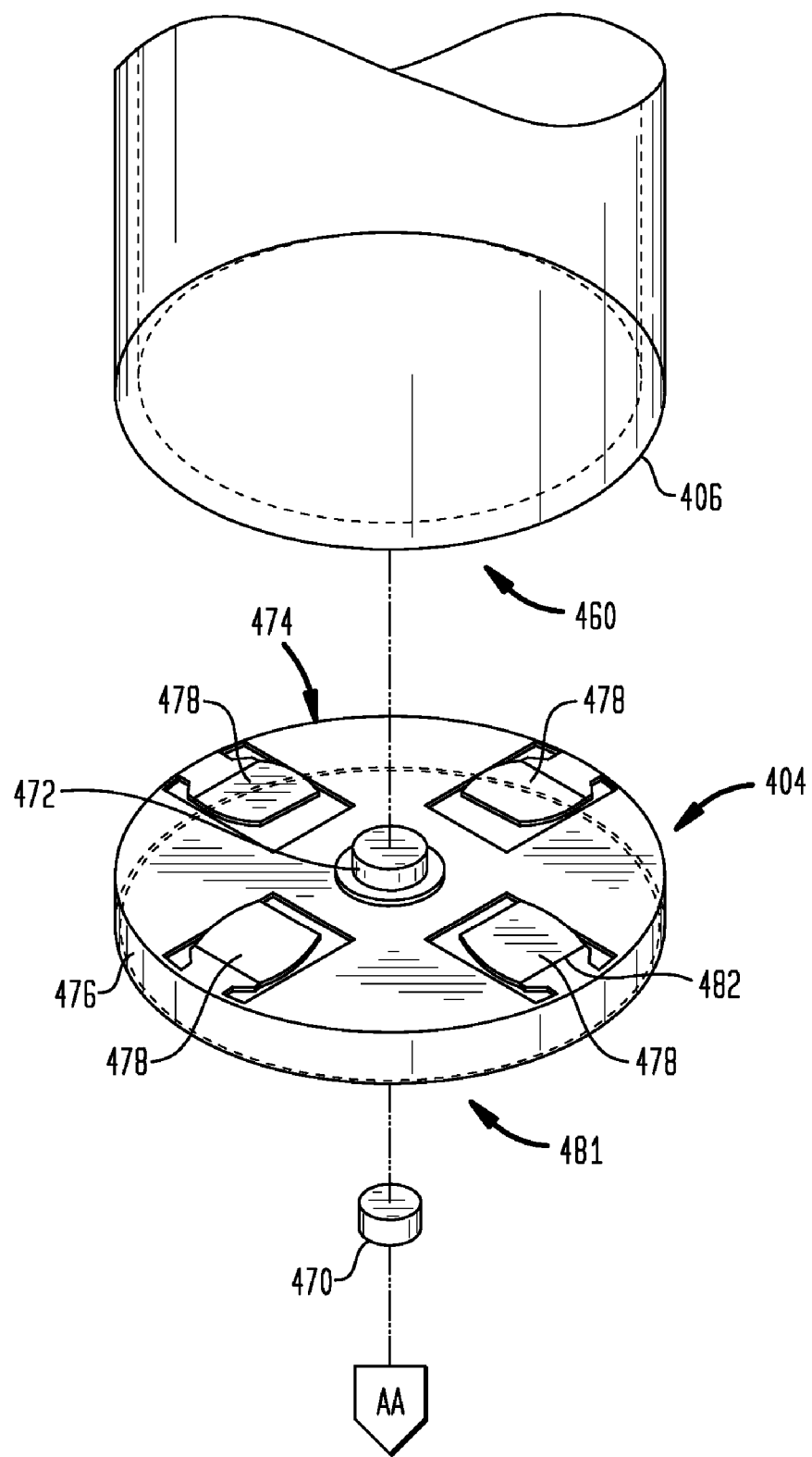
FIGS. 4A and 4B are an exploded view of an embodiment of the sensor device and holder in accordance with one embodiment the present invention.
Figure 4B:
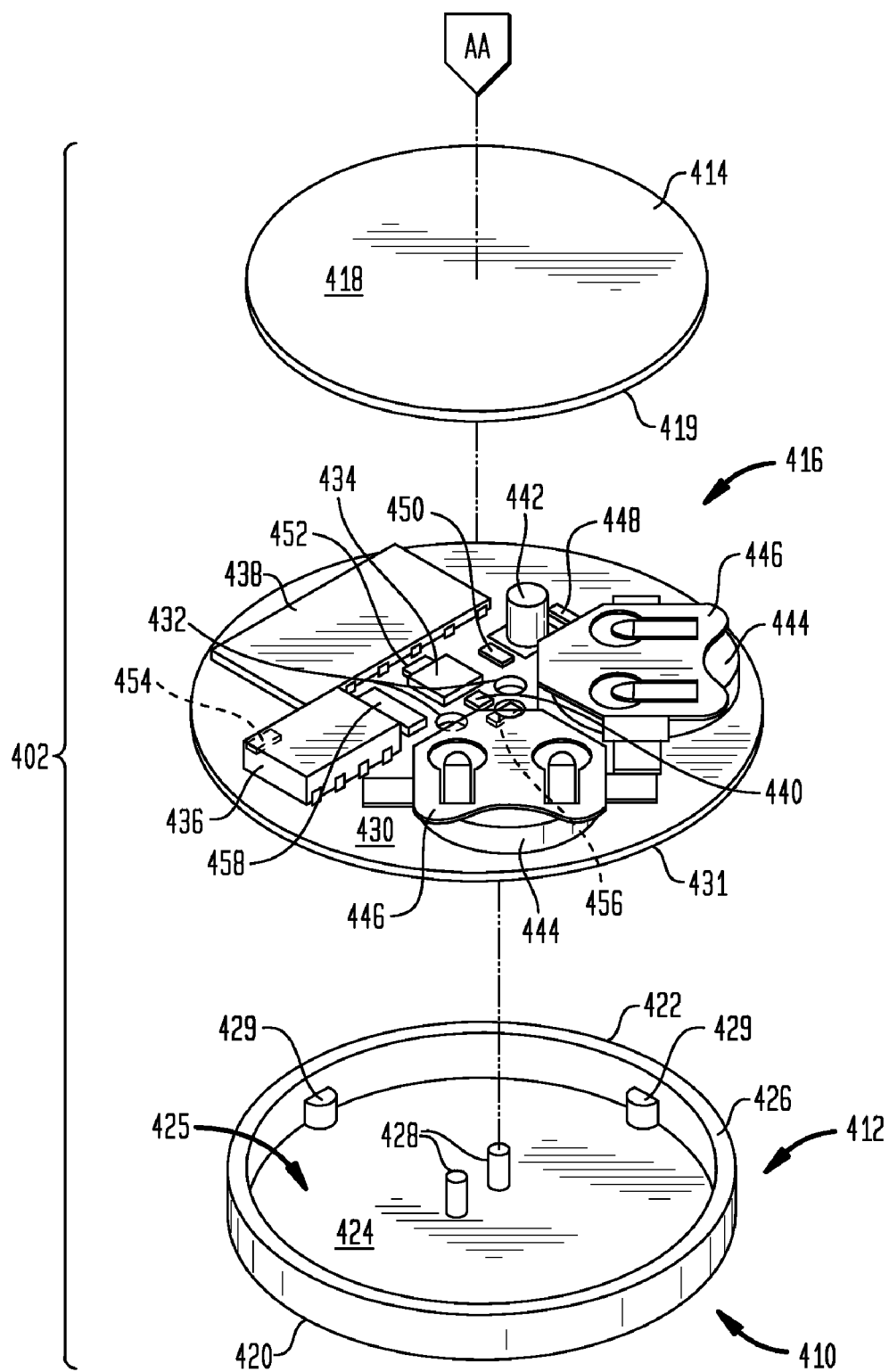

A non-fluid contacting sensor device may be used as part of the system in some embodiments of the present invention. Suitable sensor devices may include tilt sensors, such as those described in U.S. Pat. No. 6,504,481, the entire contents and disclosures of which is incorporated herein by reference. FIGS. 4A and 4B show an exemplary sensor device 402 in accordance with embodiment of the present invention which is inserted within a holder 404. Holder 404 is attached to a dispensing container 406, such as a bottle.

Sensor device 402 includes housing 410, having a cup portion 412 and lid 414, for holding a printed circuit board 416. Lid 414 has upper surface 418 and lower surface 419. Cup portion 412 has a surrounding wall 420, upper rim 422, and a substantially planar bottom 424. Wall 420 and bottom 424 form a cavity 425 to receive circuit board 416. On upper rim 422, along the inside circumference of wall 420, there is an inner ledge 426 which is slightly below the plane of upper rim 422. Lower surface 419 of lid 414 rests upon inner ledge 426 when assembled. On bottom 424 there are posts 428, and projections 429. Two posts 428 are positioned approximately in the center of bottom 424 for aligning circuit board 416. Posts 428 may extend and contact lid 414 to support lid 414 and to prevent lid 414 from contacting circuit board 416. Projections 429 are positioned along wall 420 for supporting circuit board 416. In some embodiments of the present invention, projections 429 have a smaller height than posts 428.

In some embodiments, the lid portion and cup portion of the housing of the present invention are made from plastics or rigid molded plastics, such as a polycarbonate, a thermoplastic material, or acrylonitrile butadiene styrene. Additional materials used in some embodiments of the present invention may include any materials that are lightweight, and are able to withstand heat distortion, impact resistance, and/or moisture resistance. Such materials may help protect sensor device 402 from extreme temperatures, such as from steam cleanings. Also such materials may prevent liquids that are present in establishments, such as the beverage being poured, spills or condensation, from entering sensor device 402. Further, such materials may provide shock resistance against the impact from a drop or the impact from another object. Lid 414 and cup portion 412 are removably attached to each other in a waterproof fashion using engaging threads and a sealer, such as an o-ring. In some embodiments of the present invention lid 414 and cup portion 412 are attached using sonic welding, an epoxy sealant, or a potting material.

In some embodiments of the present invention, housing 410 and holder 404 may have a substantially circular or elliptical shape as shown in FIGS. 4A and 4B. Additional embodiments of the present invention may also use other shapes such as a rectangular or square. Depending on the type of dispensing apparatus or dispensing container, the shape of housing 410 and holder 404 may vary as appreciated to one of ordinary skill in the art. Further, the shape of the remaining components, such as cup portion 412, lid 414 and circuit board 416, may be substantially similar to the shape of housing 410 and holder 404. In some embodiments, the shape of these remaining components may vary. For example, lid 414 may have a polygonal shape that assists user in aligning lid 414 in the proper position on inner ledge 426. This polygonal shape may approximate a circular shape of wall 420. In addition, circuit board 416 may be shaped in an octagon or square that fits within a substantially circular housing 412. Various other combinations of shapes may be used to accommodate when designing sensor device 402 to fit with dispensing container 406.

Printed circuit board 416 has an upper surface 430 directed towards lid 414 and a lower surface 431 that contacts projections 429. Circuit board 416 has apertures 432 which align with posts 428 and have a sufficient diameter to fit around posts 428. In some embodiments, upper surface 430 and lower surface 431 do not directly contact lid 414 or bottom 424, which may provide space for placing of components upon printed circuit board 416. The components may be placed on either upper surface 430 or lower surface 431, or both. In one exemplary embodiment, the following components are placed on upper surface 430, by soldering or other suitable techniques. Such components may include microcontroller 434, radio transmitter 436, radio antenna 438, magnetic sensing or Hall effect switch 440, mercury tilt switch 442, battery 444, battery holder 446, pull-up resistors 448 and 450, bypass capacitors 452, 454, and 456, and oscillator 458. Microcontroller 434 has a unique identifier, which may include numbers or letters. While, these components are exemplary, printed circuit board 416 may also hold additional components, such as memory or storage devices and may have any type of circuit layout suitable the shape of housing 410. Other types of components may perform the desired functions satisfactorily. For example, in lieu of radio transmitter 438, an infrared or other type of wireless transmitter could be used, and, in lieu of magnetic sensing switch 442, a mechanical switch could be used.

In one exemplary embodiment of the present invention following off-the-shelf components may be placed upon circuit board 416: microcontroller 434, part no. PIC12LC672-04/SM made by Microchip; radio transmitter 436, part no. TXM-419-LC by Linx Technologies; radio antenna 438, part no. ANT-419-SP made by Linx Technologies; magnetic sensing switch 440, part no. A3209ELH made by Allegro Microsystems; mercury tilt switch 442, part no. CM1350-0 made by Comus International; battery holder 446, part no. 3002 made by Keystone; resistors 448 and 450, part no. ERJ-8GEYJ224V made by Panasonic; capacitors 452, 454, and 456, part no. 12062R104K9B20D made by Phillips; and oscillator 458, part no. EF0-S4004E5 made by Panasonic. Oscillator 458 may be a four megahertz crystal. Additional brands and components may be substituted for other embodiments of the present invention.

Battery 444 may contact and be removable from battery holder 446. Exemplary batteries 444 suitable for embodiments of the present invention may include primary batteries, such as alkaline, zinc-air, zinc-carbon, etc., or rechargeable batteries, such as lithium ion, NiHM, NiCd, etc. In some embodiments of the present invention, sensor device 402 may hold two batteries 444 placed in parallel on circuit board 416. Battery holders 446 and their associated output leads provide a means for applying a potential to the components and circuitry of circuit board 416.

Using the exemplary components shown in FIG. 4B, embodiments of the present invention may form a circuit for performing the motion, tilt, data recording and transmitting functions of sensor device 402. Batteries 444 provide direct voltage to all components of any such circuit. There may be separate ground nets for analog and digital signals which connect only at battery terminals (not shown). A clock of microcontroller 434 may be set by oscillator 458 at an approximate frequency of four megahertz and is connected to oscillator inputs of microcontroller 434 oscillator inputs. Bypass capacitor 452 is connected between the power of microcontroller 434 power and ground to provide current reserves, preferably of 0.1 µF value. Magnetic sensing or Hall effect switch 440 has output that changes state in the presence of a magnetic field. Output of magnetic sensing switch 440 is fed to an input on microcontroller 434. Power for magnetic sensing switch 440 is provided by an output from microcontroller 434, allowing it to be turned off when not needed to extend the life of battery 444. Bypass capacitor 456, preferably of 0.1 µF value, is connected between the power of magnetic sensing switch 434 power and ground pins. Resistor 450 is a high-value pull-up resistor connected between magnetic sensing switch 440's output and power pins and the output of magnetic sensing switch 440 output is an open-collector. Mercury tilt switch 442 is connected to an input on microcontroller 434. Pull-up resistor 448, which along with mercury tilt switch 442, provides a digital input to microcontroller 434 indicating the state of mercury tilt switch 442. Input of radio transmitter 436 is connected to an output from microcontroller 434. Bypass capacitor 454, preferably of 0.1 µF value, is connected between the power of radio transmitter 436 and ground pins. Antenna 438 is a wireless communication for radio transmitter 436 and is connected to the output of radio transmitter 436.

FIG. 4A also shows sensor device 402 attached to the underside 460 of dispensing container 406 using holder 404. In some embodiments, holder 404 may have a substantially similar shape of sensor device 402 and may be slightly larger. Holder 404 includes magnet 470, magnet cavity 472, top portion 474, side portion 476, and flap portions 478. Top portion 474 is a thin, planar portion having upper surface 480 and lower surface 481. Side portion 476 is a wall having a slightly larger perimeter than sensor device 402. Flap portions 478 are generally rectangular in shape and are cut out of top portion 472 on three sides such that flap portion 478 are nonremovably, but flexibly, attached to top portion 474 along edge 482. In some embodiments, four flap portions 478 may be used, although a greater or lesser number may also work with other embodiments of the present invention depending on the dispensing container. Magnet 470 fits inside magnet cavity 472 and may be accessible on lower surface 481.

In an exemplary embodiment of the present invention, sensor device 402 fits tightly into holder 404 such that when holder 404 is affixed to dispensing container 406, sensor device 402 is securely, but removably, attached to dispensing container 406. Thus, sensor device 402 is relatively unobtrusive and may not block or obstruct the flow of the beverage from the dispensing container. When sensor device 402 is in holder 404, a lid portion 414 of sensor device 402 comes into proximity with lower surface 481 of top portion 474 such that magnetic sensing switch 440 comes into proximity with a magnet 470 of holder 404. Such an arrangement causes magnetic sensing switch 440 to close. This may be most easily achieved if magnetic sensing switch 440 and magnet 470 are both commonly located upon sensor device 402 and holder 404, respectively. This triggers microcontroller 434 to send data to radio transmitter 436. The data may include a unique identifier for microcontroller 434, the time trigger occurred, duration of tilt and the status of sensor device 402. The status of sensor device 402 is either active or inactive. The status is active if magnetic sensing switch 440 is closed. The status is inactive if magnetic sensing switch 440 is open, when magnet 470 is no longer in proximity with switch 440. Radio transmitter 436 uses radio antenna 438 to send data in a radio frequency, for example a frequency of 419 megahertz, to data receiver (not shown).

In some embodiments the holder of the present invention may be made of a molded plastic material. Such suitable materials of some embodiments of the present invention may be disposable and/or recyclable and discarded with the dispensing container when the dispensing container is empty.

Embodiments of the present invention may attach holder 404 to underside 460 of dispensing container 406 using adhesives, suction devices, clips, elastics, straps, strings, screws, bayonet mounts, and methods using pressure, drilling, twisting, magnetism, or heat, or combinations of any of these. In one exemplary embodiment, holder 404 may be attached to underside 460 of a glass dispensing container 406 using an adhesive. Such embodiment may use an epoxy glue to fuse of the glass of dispensing container 406 with holder 404. Epoxy glue is placed on flap portions 478, and holder 404 is pressed against underside 460. Flap portions 478 are flexible such that they rest against underside 460 at the necessary angle regardless of the amount of concavity of underside 460. This allows holder 404 to fit snugly to the undersides or other suitable locations of a variety of different shaped dispensing containers 406.

The dimensions of housing 410 may be such that housing 410 when assembled fits snuggly within holder 404. Likewise, holder 404 may have a dimensions such that holder 404 is able to engage a dispensing container 406. In such embodiments the dimensions of the remaining components may be apportioned from the dimensions of housing 410. For example, in one exemplary embodiment of the present invention housing 410 having a substantially disc shape has an overall diameter of approximately 7 cm (2⅝ inches) and height of approximately 1 cm (⅜ inch). Such dimension in this example may require a lid 414 having a diameter of approximately 6 cm (2⅜ inches) and a cup portion 412 having a diameter substantially equal to that of the overall dimension. Lid 414 may be approximately 0.2 cm (¹⁄₁₆ inch) thick, which would require that inner ledge 426 is approximately 0.2 cm (¹⁄₁₆ inch) below the plane of upper rim 422. In addition, in this example, posts 428 may have an approximate height of 0.3 cm (⅛ inch) and projections 429 may have a height which is less than the height of posts 428. In should be readily appreciated that in this example holder 404 may have a diameter which is slightly larger, i.e. approximately 6.6 to 7.8 cm and a height which is slightly greater than the height of housing 410. Other dimensions may be used depending on the type of dispensing apparatus to which the sensor device is attached.

In some embodiments of the present invention, the holder may be constructed to fit around the neck or the side of the dispensing container. Further, when the dispensing container has a tap or a handle that is pulled to release the liquid, the sensor device may be positioned upon the handle as to not obstruct the flow of the beverage.

In some embodiments the sensor may comprise a capacitance circuit that measures the flow of the beverage from the dispensing apparatus.

In other embodiments of the present invention the sensor device may be used in combination with a timer valve that opens a passage for a beverage to flow from a dispensing apparatus. Such suitable timer valves are described in U.S. patent application Ser. No. 09/964,679, the entire contents and disclosures of which is incorporated herein by reference. In such embodiments the timer valve may be suitable to dispensing apparatus that dispenses one type of beverage and has a greater volume than a standard bottle.

Figure 5A:
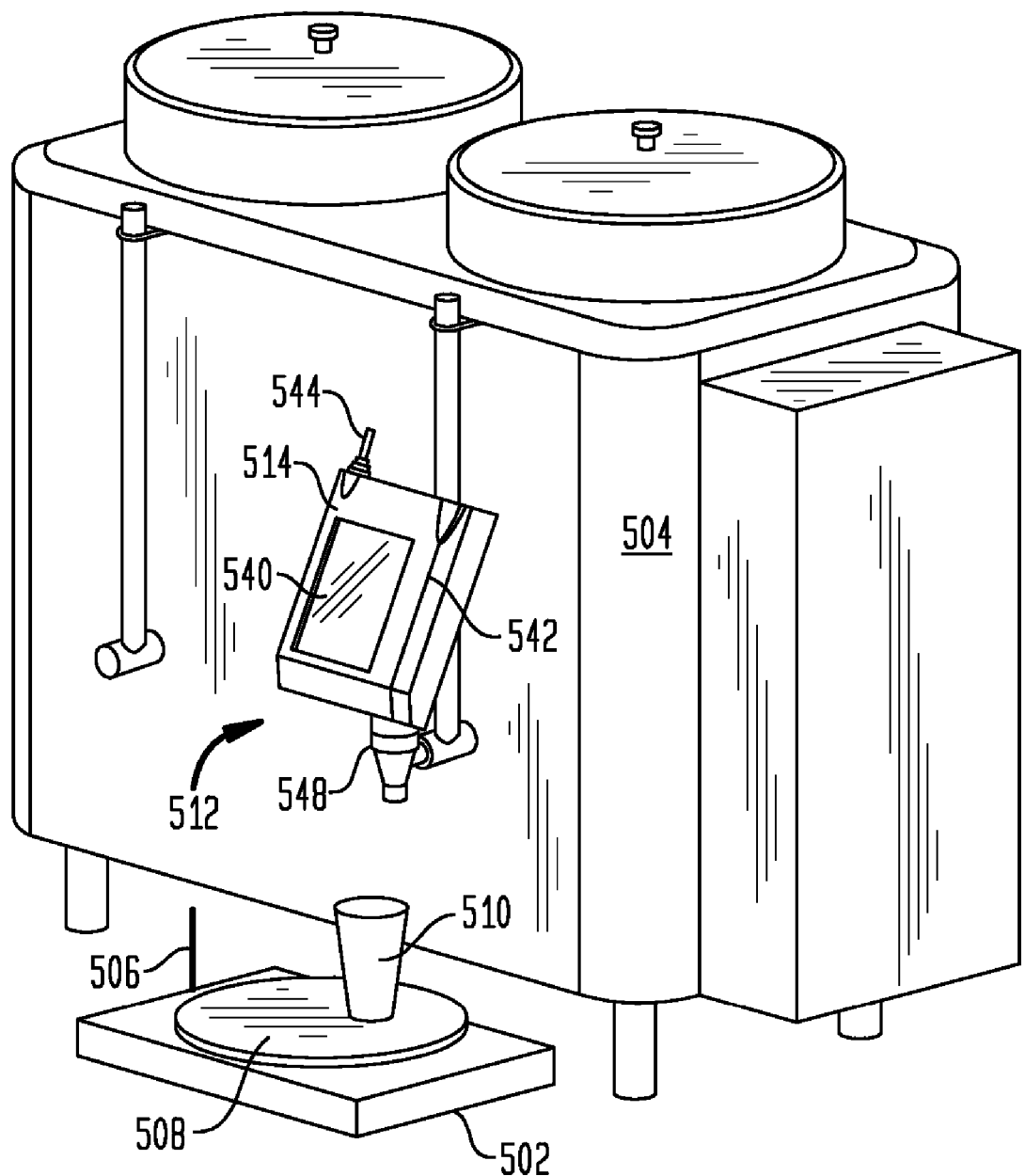
FIG. 5A is a schematic drawing of timer valve mounted to dispensing apparatus and entry device in accordance with one embodiment of the present invention.
Figure 5B:
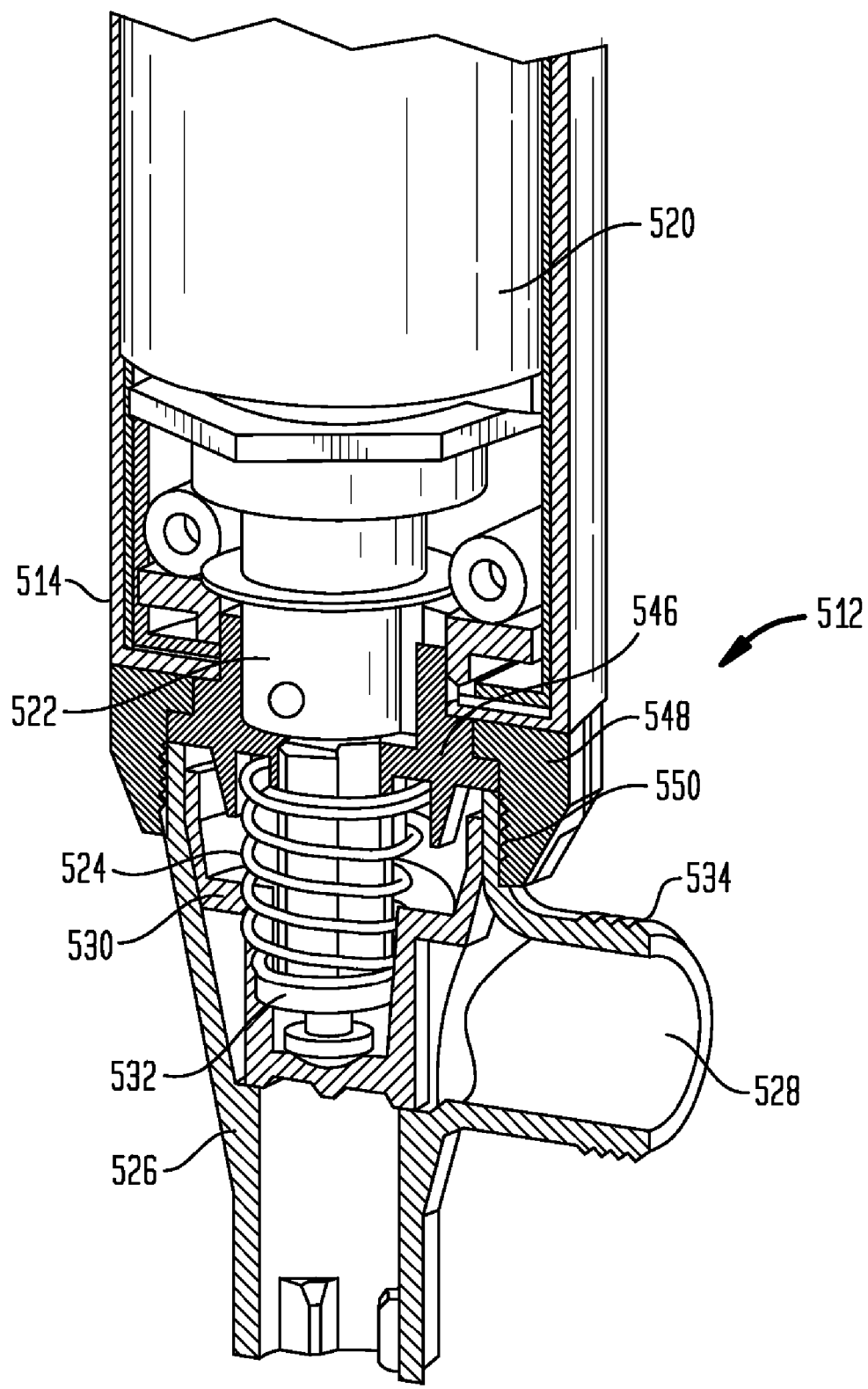
FIG. 5B is a sectional view of the timer valve shown in FIG. 5A.

An exemplary embodiment of a timer valve control system in shown in FIGS. 5A and 5B. A scale 502 is positioned proximate to a dispensing apparatus 504. Scale 502 may be any suitable scale, such as the exemplary embodiment described in FIG. 2, having a communication link (antenna or wired link (not shown)) 506 and weight pad 508. A container 510 rests upon weight pad 508 underneath valve assembly 512. Valve assembly 512 is in fluid communication with dispensing apparatus 504 and in mechanical or electrical communication with information entry device 514. Valve assembly 512, also shown in a cut-away view in FIG. 5B, comprises pull type solenoid 520 that retracts to lift a solenoid plunger 522. Solenoid plunger 522 pulls up on a valve spring 524, which may allow the filling of container 510 with a beverage that travels out of through a spigot 526. The serving may travel from the dispensing apparatus 504 through conduit 528 out through spigot 526. Solenoid plunger 522 also lifts up a valve stopper 530 and a valve plunger 532, when solenoid plunger 522 lifts up on valve spring 524. In some embodiments of the present invention, valve stopper 530 may be constructed from rubber or a similar material. On the exterior of conduit 528 there are threads 534 for engaging corresponding threads on dispensing apparatus 504.

FIG. 5A also shows an information entry device 514 as constructed in accordance with an embodiment of the present invention. A user, preferably, the waiter or bartender, may enter identification information, dispensing information or destination information by entering the information on a touch screen 540. In some embodiments touch screen 540 may be replaced by a keypad, QWERTY keyboard, or touch pad. Alternatively, a user may enter identification information, dispensing information or destination information by swiping a magnetic card through a reader 542. Entry device 514 has an antenna 544 to communicate such point-of-sale information to a data receiver or computer. In an alternative embodiment, the identification information, dispensing information, communication information or destination information may be transmitted via a conventional wired connection.

Once the dispensing system is ready to dispense the serving, a user may place container 510 on scale 502 under a spigot 526. Valve system 512 may be activated after the entry of point-of-sale information, such as identification, dispensing and destination information. Entry device 514 may be attached to valve system 512 using a stem 546 having a mounting collar 548. Mounting collar 548 has screw threads 550 which engage corresponding threads on valve system 512. Entry device 514 may also house electronic circuitry, such as processors, radio transceivers, memory, storage mediums, etc., for operating valve system 512 in response to information entered.

Although in FIGS. 5A and 5B there is shown screw threads for mounting valve system 512 to dispensing apparatus 504 and entry device 514, alternative attachment means may also be used. In some embodiments a rubber seal may be used that fits snuggly between the mounting valve and dispensing apparatus. Other embodiments may use an adhesive.

Figure 6A:
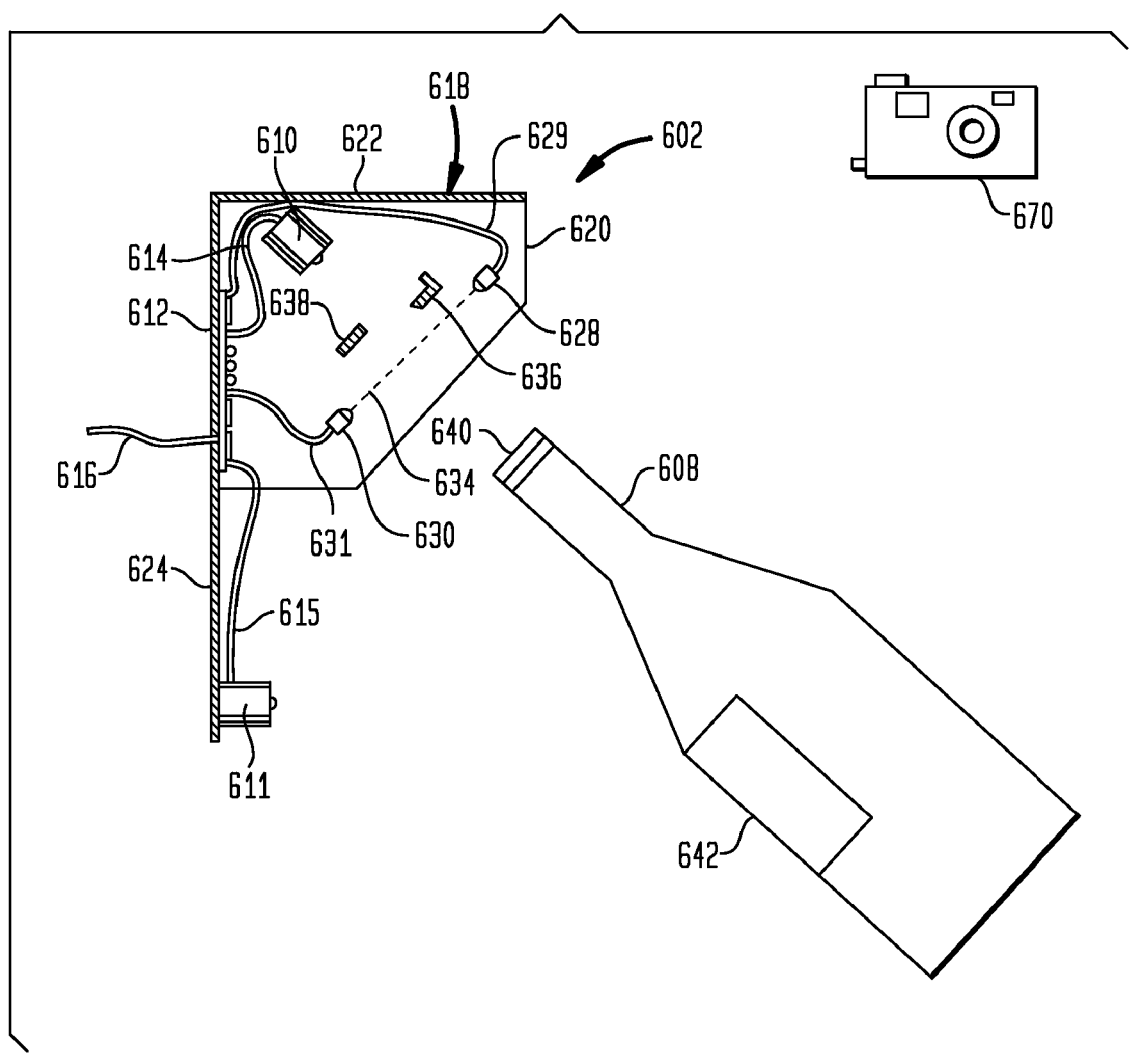
FIGS. 6A and 6B are views of a bottle opener camera system in accordance with one embodiment of the present invention.
Figure 6B:
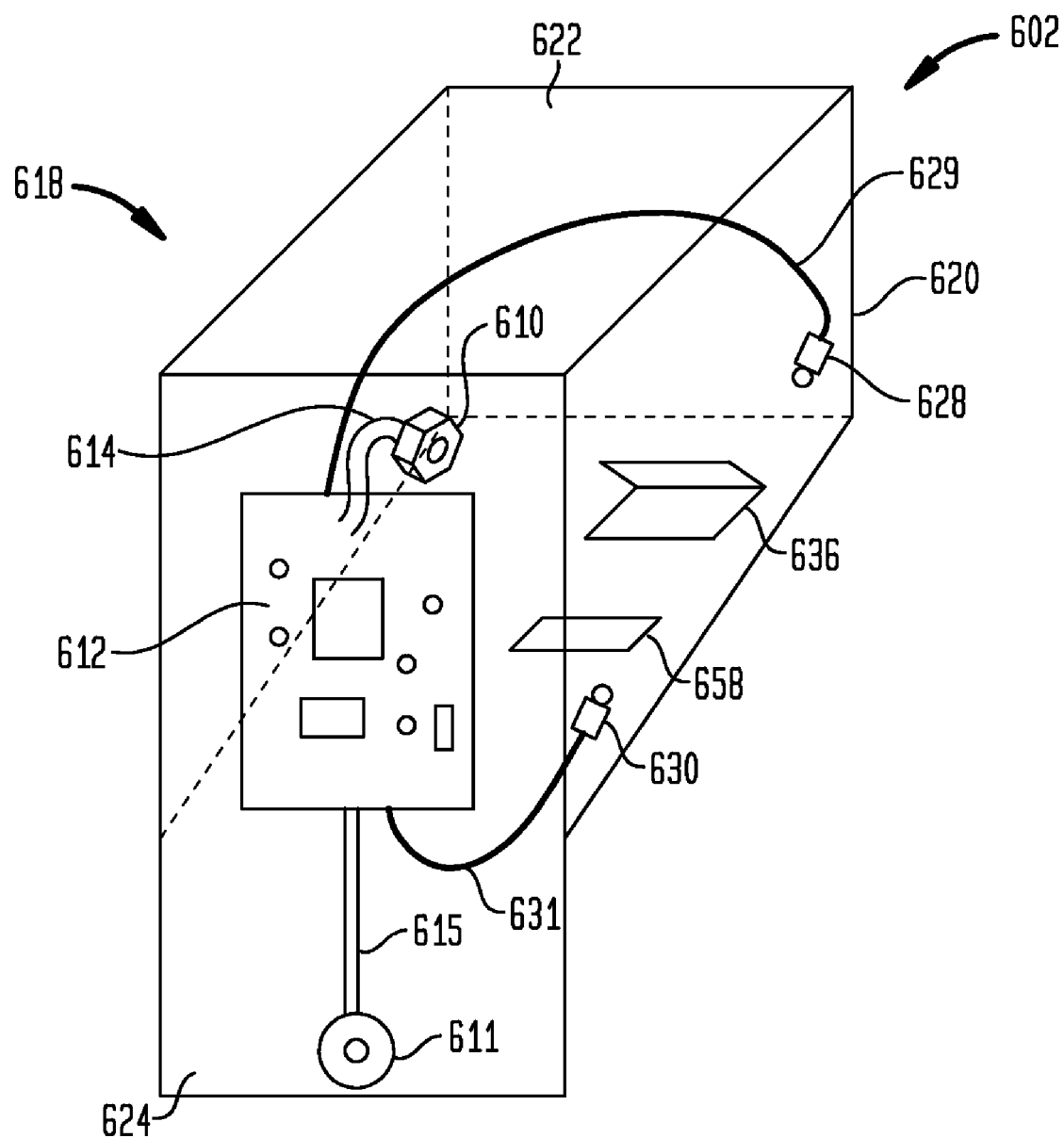
Figure 6C:
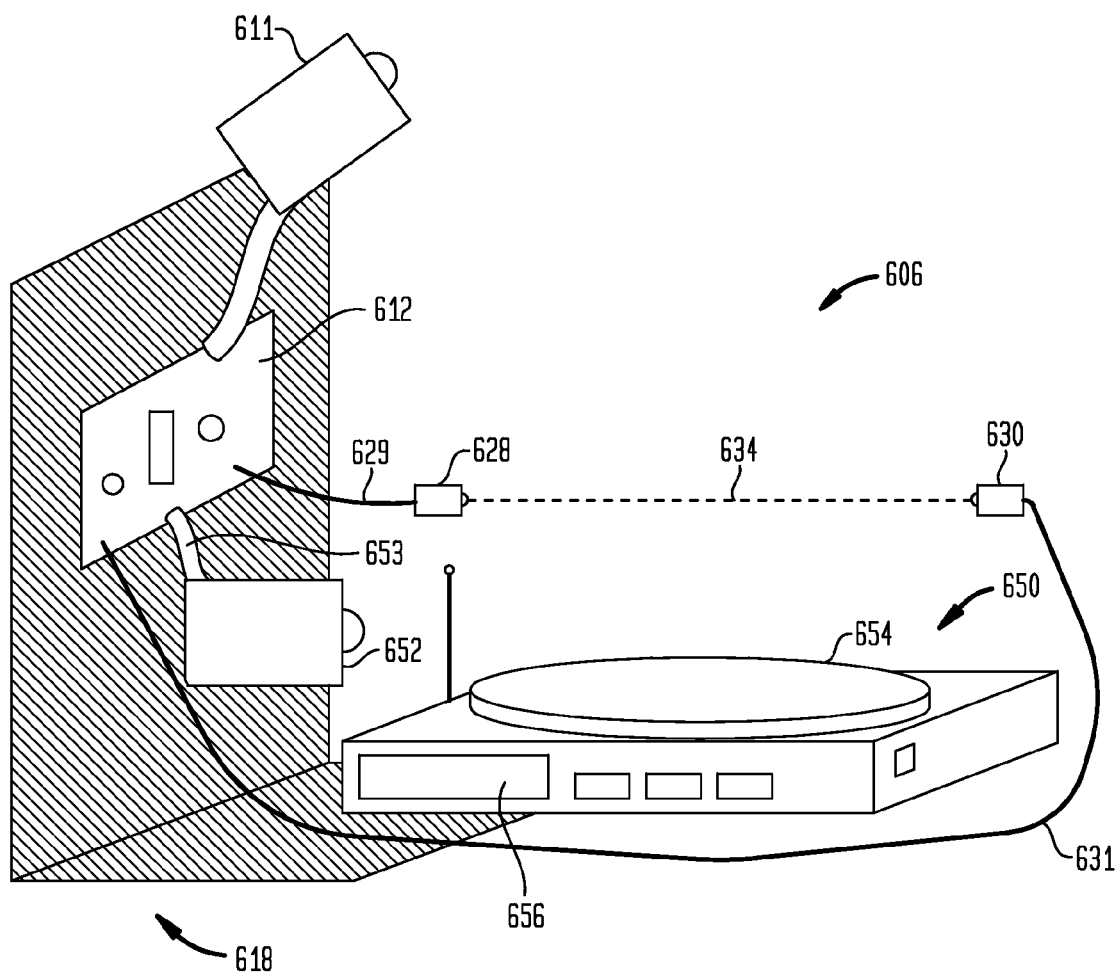
FIG. 6C is a perspective view of a scale camera system in accordance with one embodiment of the present invention.

Embodiments of the present invention may also have cameras to record images or videos of actions associated with the dispensing events. The terms images and videos are intended to broadly refer to all types of visual pictures and may be used interchangeably. FIGS. 6A and 6B show a bottle opener camera system 602, while FIG. 6C shows a scale camera system 606. Images taken from both types of cameras may be used to determine the brand of beverage which was dispensed during the dispense event. Both types of cameras systems allow the user to record images for multiple purposes, such as reconciliation, security, and video auditing, as described below.

In FIGS. 6A and 6B, there is a bottle opener camera system 602 that detects dispensing events from a dispensing container 608. Dispensing container 608 may be a single serving bottle that contains beer or a multi-serving bottle that contains liquor. In camera system 602 there are two cameras, a bottle opener camera 610 and a bar camera 611. Opener camera 610 is connected to a control board 612 through a connection link 614 and bar camera 611 is connected through connection link 615 to control board 612. Connection links 614 and 615 may send and receive data signals and may provide power to cameras 610 and 611. In addition, connection links may comprise a wireless transfer. Control board 612 is a printed circuit board having various mounted electrical components. Control board 612 is connected to a computer or data receiver (not shown) through communication link 616. Opener camera 610 may be removably mounted in a housing 618 which is mounted to a ledge or countertop (not shown). In one embodiment, housing 618 has a backwall 620, horizontal wall 622 and vertical wall 624 which allow access to open access to housed components from multiple angles which is suitable to bar establishments.

Also in housing 618 there is an upper LED 628 attached to a support cord 629 and a lower LED 630 attached to a support cord 631. Support cords 629 and 631 are attached to control board 612 and carry communication signals to control board 612 from LEDs 628 and 630. Control board 612 may send power and data signals, such as instructions, to LEDs 628 and 630. Support cords 629 and 631 are cased in a flexible material that retains a rigid shape when positioned. To align LEDs 628 and 630, a test signal may be used to find a common axis 634. On backwall 620 there is an opener 636 and rest 638 which extends outward.

A trigger may occur when an IR beam is broken between LEDs 628 and 630 along common axis 634, this activates opener camera 610 and bar camera 611 to begin recording images or video. The data is processed by control board 612 and sent for further storage, reconciliation, auditing or analysis. Opener camera 610 records the cap 640 of dispensing container 608 prior the opening and stores the image. Opening may be done by placing cap 640 of dispensing container 608 on rest 638 and using opener 636 to open dispensing container 608. During the triggered condition, bar camera 611 may also record images or videos of the activities associated with the dispensing event, such as the label 642 on the side of the dispensing container 608. This may be useful for auditing the data by having visual data of such activities. Once dispensing container 608 is taken out of housing 618, the IR beam is re-established between LEDs 628 and 630. The trigger stops and the images or video from cameras 610 and 611 is completed. Data from camera is processed by control board 612 and sent to a camera receiver, database or personal computer.

FIG. 6C shows another embodiment of the present invention of scale camera 606, in which housing 618 is placed around scale 650. Scale 650 may be the scale shown in FIG. 2, or a similar scale. Similar to the arrangement shown in FIGS. 6A and 6B, LEDs 628 and 630 are aligned along common axis 634. Once the IR beam is broken along common axis 634, a trigger event occurs. Instead of opener camera 610 used in FIGS. 6A and 6B, a scale camera 652, connected to control board 612 using communication link 653, is used to record dispensing container 608 resting upon weight pad 654. Scale camera 652 may be positioned to capture an image of dispensing container 608, label 642 and display 656 of scale 650. Bar camera 611 may be positioned to capture the user of the scale or the establishment during the dispensing event.

In further embodiments of the present invention, a handheld camera 670 may be used to record images or video. Handheld camera 670 may be placed in the user's hand or attached to the user's body, i.e. in shirt pocket, or on a hat. Handheld camera 670 may also be mounted in place of any camera in system 602. Various types of handheld cameras may be used, such as camera cell phones or portable cameras.

Once a trigger condition occurs, handheld camera 670 may begin recording.

In some embodiments of the present invention, the cameras shown in FIGS. 6A, 6B and 6C may continuously record images or video. Once a trigger condition occurs, control board 612 or the database (not shown) flags the images or video as related to a dispensing event. The images or video not flagged are removed and discarded. In some embodiments, the bar camera may continuously record images without discarding images to act as a security camera.

In some embodiments, a bar cameras may comprise a plurality of cameras which capture different images of the dispensing event. For example, one camera may capture the scale area, another camera captures the proximate area of the scale from an aerial position, while still another camera captures an image of the entire serving area.

Although an LED trigger is shown in FIGS. 6A-6C, alternative embodiments of the present invention may record images once a gradual weight or weight increase is measured by the scale. Such an arrangement may be used to determine the brand of beverage being dispensing by either recording the activity on the scale or the activity near the scale.

In some embodiments, a RFID tag may be attached to the dispensing apparatus either in addition or in place of a tilt sensor. The RFID tag may be a unique ID that identifies the brand of beverage in the dispensing container. A scale may have an RFID reader for detecting when an RFID tag is on or proximate to the scale. Upon detection, the scale may be activated and any measurement of a gradual weight or weight increase is recorded and correlated to the RFID that was detected in accordance with POS reconciliation methods of the present invention. In other embodiments, the detection of the RFID may indicate that a tilt condition has occurred without the activation of a scale or valve system. In other embodiments, the system may activate the RFID in a bottle once a weight change is measured. A computer may receive a signal from the activated RFID along a timestamp that can be reconciled with the weight change.

In some other embodiments of the present invention, a bar code may be read by the scale from the dispensing apparatus. The bar code may be the bar code produced from the manufacturer or distributor or may be a secondary bar code created for each establishment and placed on the dispensing apparatus at each establishment. A secondary bar code may provide an establishment with the ability to customize the control of information related to the dispensing apparatus. The bar code may represent a unique ID from which the brand of the beverage and total starting initial volume may be determined. Conventional bar code readers may be used along with the camera system. Upon reading the bar code, the scale may be activated and the gradual weight, end weight or weight increase recorded may be correlated with the bar code information detected.

Figure 7:
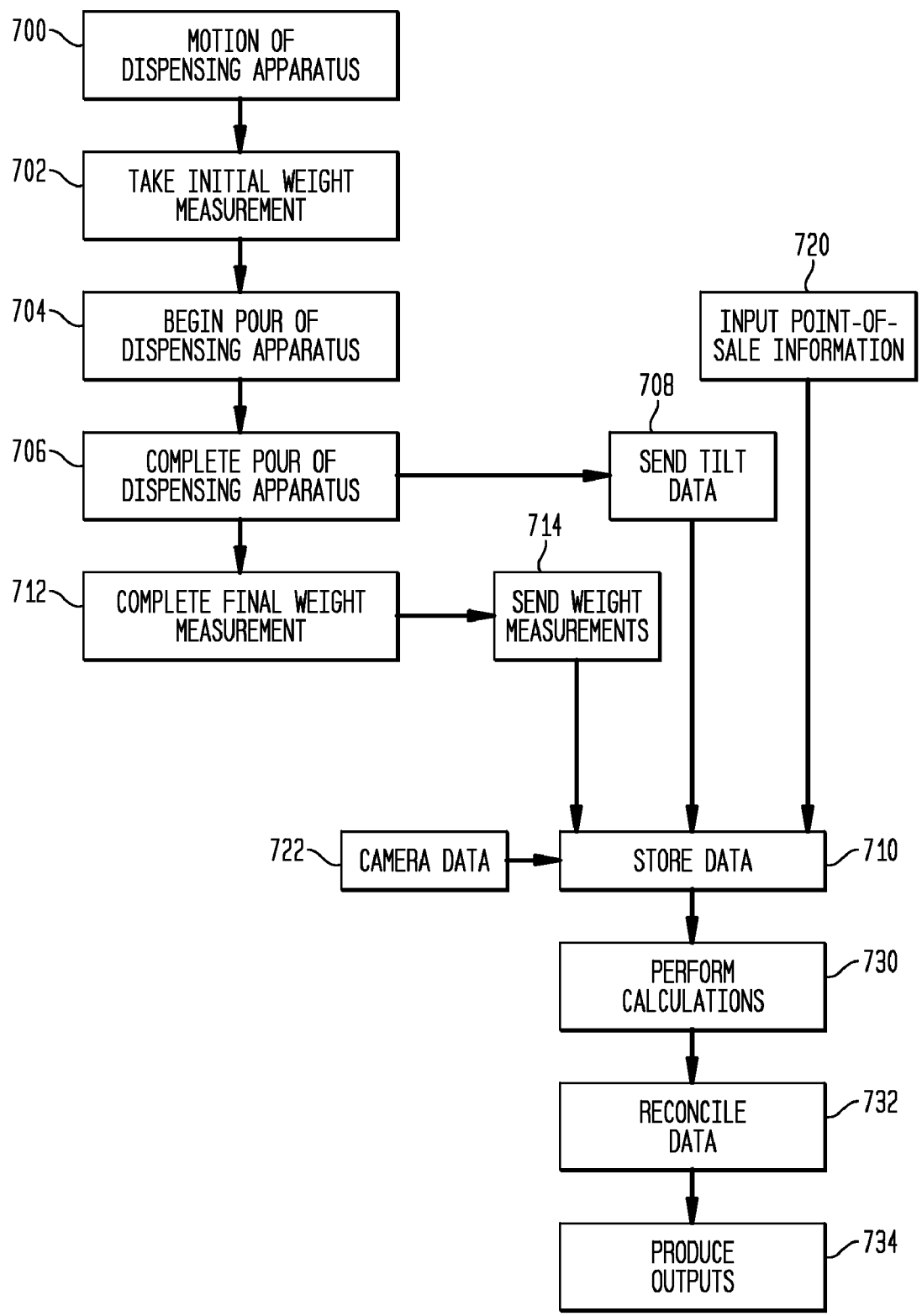
FIG. 7 is a flowchart of an overall method in accordance with one embodiment of the present invention.

Methods and systems of the present invention may employ any combination or number of the exemplary apparatuses and systems described above. FIG. 7 is a general block diagram of an overall method according to an embodiment of the present invention. To place the system in an active mode, a sensor device attached to the dispensing apparatus indicates movement in step 700. Alternatively, activation may be made by a motion sensor not attached to the dispensing apparatus, bar code reader, RFID tag, or activation may occur after the entering of point-of-sale information. The system begins to anticipate the next steps. If the events occur that are not anticipated, i.e. no scale measurement, then an error may be flagged and an alert sent to a manager. In step 702, a scale having a unique ID makes an initial measurement and begins the time measurement. The unique ID of the scale may be assigned to a user, such as a bartender or waiter. In some embodiments the initial measurement is of an empty container to receive a dispensed beverage that is placed on the scale. In such embodiments the duration of the weighing of the container is a scale time. Some embodiments may take an initial measurement of the weight of the container. Other embodiments may make an initial measurement of the dispensing apparatus plus beverage (DAP) and the duration is the pour time or the time between two discrete measurements. In the embodiments which measure the weight of DAP, the end weight may be determined based on a previous weight measurement stored in the database instead of the initial weight.

Next in step 704, the dispensing apparatus pours the beverage into the container and a sensor attached to dispensing apparatus begins to measure a tilt or motion. Once the motion or tilt is completed, in step 706, the sensor transmits the tilt data or motion data in step 708 to a database or computer to store the tilt data in step 710. In step 712, the scale measures weight and duration to complete data for the weight profile and in step 714 scale sends such data to a database or computer in step 710. Step 710 may repeat for each time it is necessary to store data in database or computer. For example, scale may transmit the activation time of the scale and scale unique ID, and separately transmit the weight profile as in two discrete transmissions. In step 720 one inputs point-of-sale information to be stored in a database or computer in step 710. Step 720 may occur before step 700 or during at any point during steps 700 through 714. In addition, an optional step 722 of inputting image or video from a camera may also be stored in step 710. Prior reconciling the data, in step 730 any calculations, such as duration or weight profile, are performed. In step 732, the system of the present invention may reconcile part or all the data stored in step 710 to determine that a dispensing event has occurred and to link the dispensing event with the associated data. To complete the process in step 734 the system generates an output.

Figure 11B:
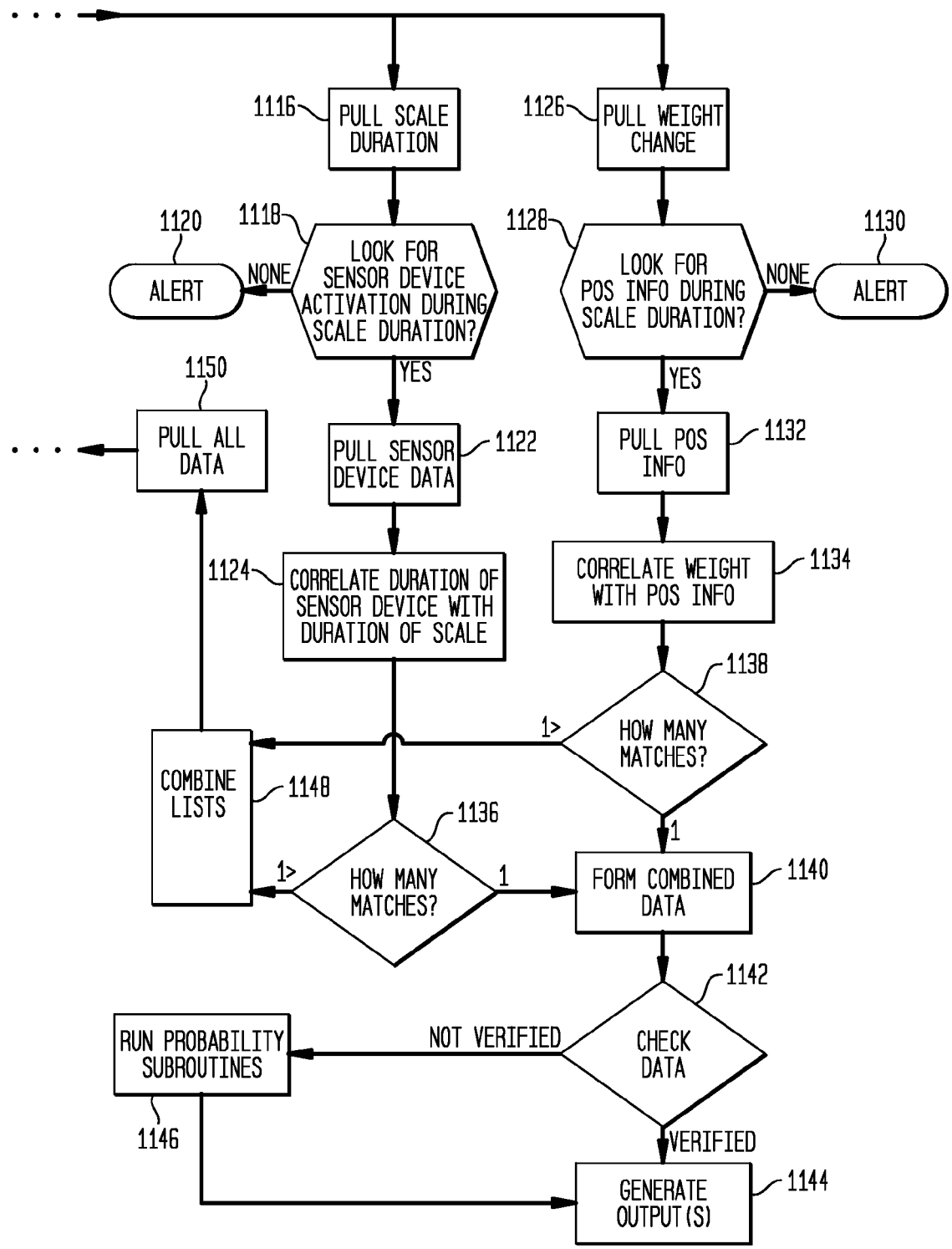

As shown in FIG. 7, embodiments of the present invention generally have a dispense event that occurs substantially within a scale time measurement. A dispense event may be entirely within a scale time measurement or may share a common duration with the scale time measurement. In an embodiment, the dispense event occurs as the container rests on the scale. In another embodiment, the dispense event occurs between two separate discrete measurements of a dispensing apparatus. Both of these embodiments are shown in further detail in FIGS. 8A and 8B. Once the information from the sensor and scale are obtained, as well as the point-of-sale information, including serving, dispensing, destination, or identification information as shown in FIG. 9, and camera data are obtained as shown in FIG. 10, the embodiments of the present invention may reconcile the data as shown in FIGS. 11A and 11B.

Figure 8A:
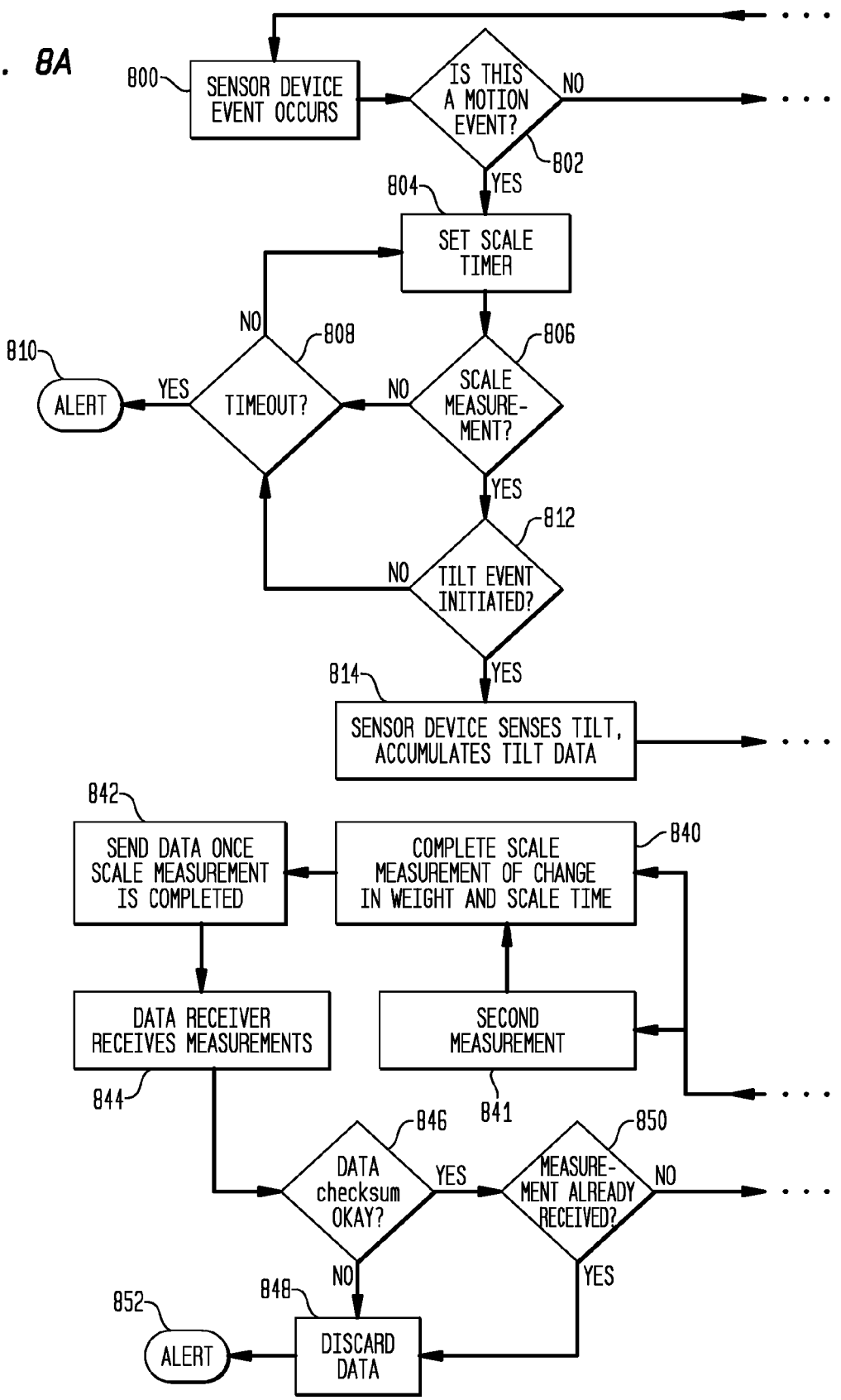
FIGS. 8A and 8B are flowcharts of a process of a scale and sensor device in accordance with one embodiment of the present invention.
Figure 8B:
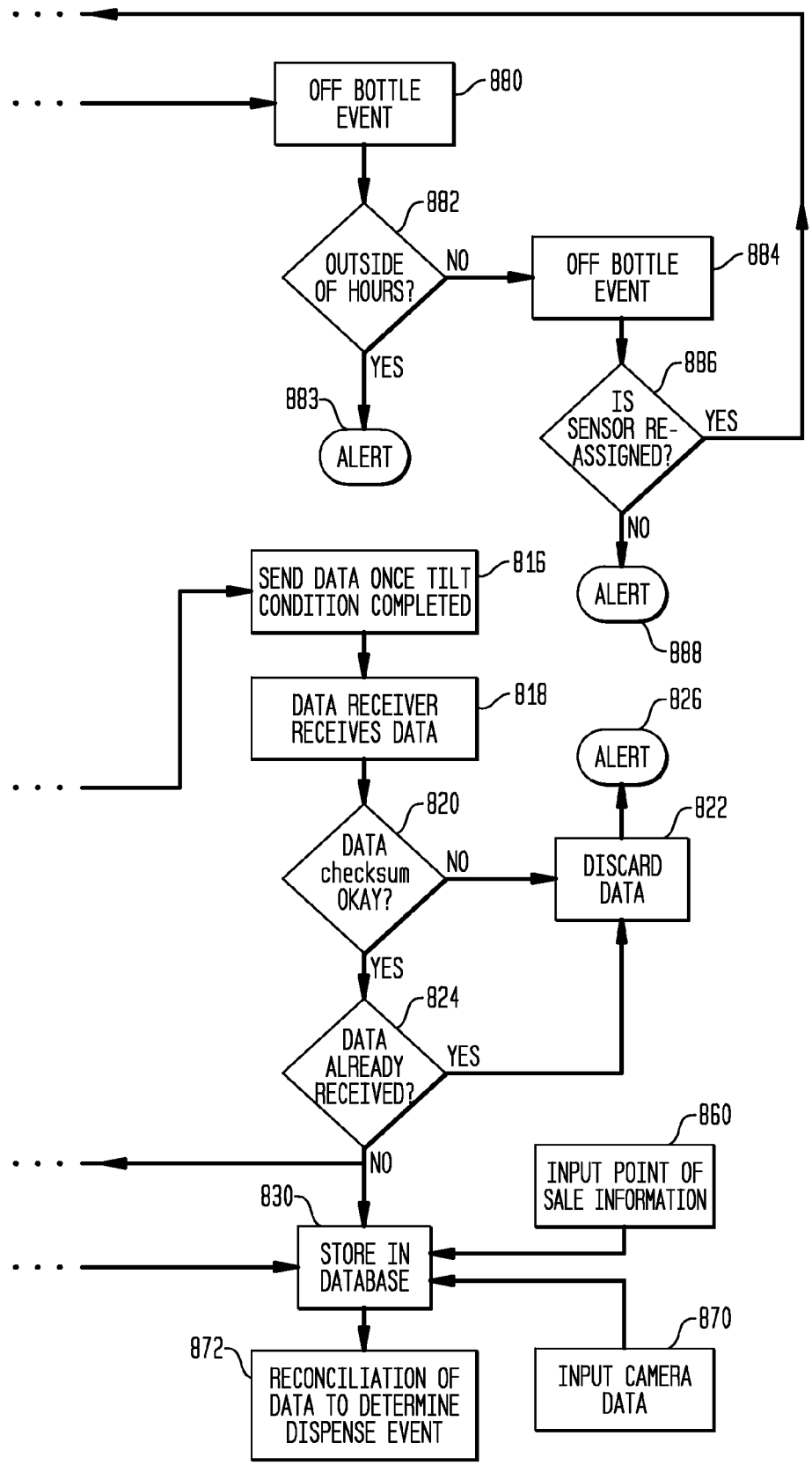

In FIGS. 8A and 8B, there is shown a method of detecting a tilt condition or motion event from a dispensing apparatus in accordance with one embodiment of the present invention. In step 800, a sensor device attached to a dispensing apparatus is moved and the sensor indicates an initial movement. In step 802, it is determined whether the event is a motion or an "off-bottle" event. A motion event occurs when dispensing apparatus is moved from the storage position into a position to dispense a beverage, i.e. taking a dispensing container from a shelf. An off-bottle event occurs when sensor device is removed from the dispensing apparatus. The motion of the dispensing apparatus may be tracked by a sensor device attached to the dispensing apparatus, a shelf tracker, or by tracking the motion of the dispensing apparatus using a triangulation technique. In some embodiments, a shelf tracker may sense a motion of a dispensing apparatus as it is removed from a storage area, such as a shelf, drawer, closet, ice box, refrigerator, etc. When the dispensing apparatus leaves the storage area the shelf tracker motion sensor sends a signal to the system to record removal. This may also track which dispensing apparatus is removed from which location and may help identify dispensing apparatus which are improperly stored. In other embodiments, a wireless motion sensor may be attached to each bottle to track the motion of the dispensing apparatus. The tracking may be done using positioning sensors, transceivers operating over RF links, and base stations that triangulate the position of the dispensing apparatus within an establishment. Such tracking may be performed by satellites using a global positioning system or the Galileo navigation system.

If, in step 802, a motion event has occurred, then, in step 804, the system activates a scale timer to begin to anticipate a measurement on the scale. The system may activate a specific timer which is assigned to a bartender based on the sensor device that is moved to start a scale timer. The sensor device would also be assigned specifically to the same bartender. Alternatively, the system may activate a general timer for all sensors to begin searching for a scale measurement. The scale timer is a timeout function to monitor whether a tilt event occurs in step 806 after the initial scale measurement. For purposes of one embodiment of the present invention, the scale measurement may begin with a placement of a container on a scale and/or a taring of the scale with the container on the weight pad. In another embodiment of the present invention, the scale measurement may begin with the placement of the dispensing apparatus plus (DAP) beverage on the scale and or a taring of the scale with the DAP on the weight pad. If no scale measurement is made in step 806, the system in step 808 checks the scale timer. If the timeout condition exists in step 808 and alert to a manager in step 810 is made. If the timeout condition does not exist in step 808, the system continues to wait for the scale measurement.

Once the scale measurement in step 806 begins, the scale begins to record weights at time intervals and tracks the duration of the scale activity. In step 812, the system of the present invention determines whether the tilt begins. If no tilt begins, the timeout step of 808 may be used to determine if an error has occurred. If there is no tilt after the scale measurement, an alert in step 810 may be sent. Assuming that the tilt begins, the sensor device begins to measure the tilt data, including duration, in step 814. For example, the tilt condition may occur when the dispensing apparatus is tilted from an approximate vertical position to an approximately horizontal position, by the closing of a tilt switch. The closing of a tilt switch triggers microcontroller to start measuring the time apparatus is tilted. As the beverage is being poured, sensor device continues to measure the time dispensing apparatus is tilted. Once the dispensing apparatus is returned to the upright position, sensor device stops measuring the duration of the tilt. This may be accomplished by the opening of a tilt switch, which triggers microcontroller to stop measuring the tilt time. In step 816, sensor device begins to transmit tilt data over a wireless link and in step 818 the data receiver receives the data. The tilt data may include the unique identifier of the particular sensor device in use, the status of sensor device, "on bottle" or "off bottle," the duration of the tilt, the time the tilt began, the time the tilt ended, the time since the tilt occurred, and the number of times the particular dispensing apparatus has been tilted since its sensor device was attached. Sensor may send the tilt data at appropriate intervals, such as approximately 10 seconds when operating over a frequency of 718 megahertz, or after the tilt condition is completed. As a failsafe mechanism, sensor device may also transmit the same type of data from the last four times that this particular dispensing apparatus was tilted. In some embodiments tilt data may be sent three times as a default and may be adjustable by the user. Each transmission is separated by a discrete, set time interval, such as ten seconds, and the transmission is numbered with a unique identifier.

After step 818 and prior to storing the data in the database, the data receiver verifies the data checksum in step 820. If, in step 820, the data checksum is not valid, then, in step 822, the data is discarded. If, in step 820, the data checksum is valid, then, in step 824, a determination of whether this particular data was already received is made. If, in step 824, this data was already received then, in step 822 the data is discarded. After discarding data in step 822, an alert may be sent in step 826. If, in step 824, the data was not already received, then in step 830 the data is stored in a database. The database may be separate from the computer that performs the reconciliation steps or integral with such computer.

Also in step 824, if the data is received, the system returns to the scale to complete the measurement in step 840. In one embodiment, the processor of the scale measures the time and change in weight at time intervals. In such embodiments, the container remains on the scale. In another embodiment, the processor measures the pour time and the change in weight between two measurements by taking a second measurement in optional step 841. In step 842, sensor device begins to transmit scale measurements over a wireless link and in step 844 the data receiver receives the scale measurements. The data receiver may be the same data receiver used to receive the tilt data. The scale measurements may include the time the scale first measured a weight, the duration of the weight and the weight at each set time interval. Prior to storing the scale measurements in the database, the data receiver verifies the data checksum in step 846. If, in step 846, the data checksum is not valid, then in step 848 the scale measurements are discarded. If, in step 846, the data checksum is valid, then in step 850 a determination of whether these particular scale measurements were already received is made. If, in step 850, these scale measurements was already received then in step 848 the measurements is discarded. After discarding scale measurements in step 848, an alert may be sent in step 852. If, in step 848, the data was not already received, then in step 830, the scale measurements are stored in a database. The database may be separate from the computer that performs the reconciliation steps or integral with such computer. In addition, the database may be the same database or a related database that stores the tilt data.

In step 830, additional data may also be stored including point-of-sale information from step 860, described more fully in FIG. 9, and camera information from step 870, described more fully in FIG. 10. The data which is stored may be reconciled to link matches in step 872.

If, in step 802, a motion event did not occur, then in step 880 it is determined that an "off-bottle" event has occurred. Next, in step 882 it is determined whether sensor device was removed outside of valid hours. Valid hours are the hours during which bar management permits sensor devices to be removed from dispensing apparatus, and are set in advance. For example, sensor devices may only be permitted to be removed from 8 a.m. to 10 a.m. each day, i.e. when inventory is made. If, in step 882, sensor device was removed outside of valid hours, then, in step 883, an alert is made.

If, in step 882, the removal occurred during valid hours, then, in step 884 the motion is recorded as an off-bottle event. Once, an off-bottle event occurs, the system may determined whether the calculated remaining volume of the dispensing apparatus is greater than the empty volume. The calculated remaining volume is obtained from the database, which has tracked the number of dispensing events for this particular dispensing apparatus and the total duration of pouring time and has calculated a pour rate. Assuming the calculated remaining volume is not greater than empty, i.e., volume is calculated to be empty, then the pour rate may be calculated. However, if the calculated remaining volume is greater than empty, i.e., there is still beverage contained in dispensing apparatus, then an alert may be sent.

Next, in step 886, it is determined whether sensor device is unassigned, i.e. whether it was not assigned to a particular dispensing. If sensor device is unassigned, then an alert is made. If, in step 886, sensor device is assigned to a dispensing apparatus, then the process may repeat at step 800. In addition, when the sensor device is assigned systems of the present invention may determine to whether bar camera is enabled. Once the bar camera is enabled, the images or video pertaining to the particular dispensing event is saved and stored in a database. An unassigned sensor may send an alert in step 888.

The alerts that are made during the method described in FIGS. 8A and 8B, may be any of the following types of alerts or a combination of one or more of the following alerts. These include alerts that are sent as a text, visual or audible message to a manager's pager, hand-held device or cell phone. Also, the alert may be sent by e-mail or by a telephone call to a manager on-site or at a remote location. The alert may also be posted in the database by flagging the scale or sensor device on which the alert condition occurred. Also, the alert may deactivate the particular device that caused the alert condition and thus prevent the user from continuing.

The point-of-sale information may be entered in a number of ways. For example, point-of-sale information may be entered using at a cash register or similar computer system which is connected to a database. The types of point-of-sale information, i.e. identification, dispensing, and destination information, may be entered using different means or techniques. The point-of-sale information may define a serving that is reconciled with the scale data. For example, a serving may be based on data such as 1 ounce of rum, served to table 35A, and dispensed at 10:00 pm by waiter X. Embodiments of the present invention may determine that the 1 ounce of rum came from dispensing apparatus Z within the scale or pour time recorded on scale W. This may be verified or confirmed by reconciling the approximate weight measured from scale W, duration of weight measurement, tilt data, and/or weight profile with the serving amount entered with the dispensing information.

An another method of entering point-of-sale information is to enter the information in conjunction with the dispensing event as shown in U.S. application Ser. No. 09/964,679, the entire contents and disclosures of which is hereby incorporated by reference.

FIG. 9 is a flow chart that illustrates one embodiment of the present invention for controlling the operation of a dispensing apparatus while entering point-of-sale information. All steps not indicated as performed by a user are performed by a control system, such as a computer system, for controlling the operation of the dispensing apparatus. In step 900, a user enters identification information. In step 902, the identification information entered in step 900 is verified and the entry of valid identification information will place a dispensing apparatus in a ready state, in step 906. The dispensing apparatus may be placed in a ready state by activating the sensor device or valve. If, in step 902, the identification information entered in step 900 is not valid identification information, the system will reset, and a user may re-enter identification information in step 900. An owner of a dispensing system or an authorized individual may limit the number of reentries a user may attempt by setting a limit.

In step 908, a user enters dispensing information and in step 910 enters destination information, both of which are stored in database on a storage medium 914. In addition, the identification information entered in step 902 may also be stored on storage medium 914. The dispensing information refers to a variety of data that the user enters to create the desired serving. Typically, a user or server may enter the dispensing information using a keypad, keyboard, a user-controlled interface, stylus pad or touch screen. A user or server may also enter the dispensing information by scanning or entering a bar code or magnetic strip wherein the information is contained. The destination information refers to the location of the recipient where a serving and/or bill are to be delivered. Typically, the recipient may be the user or customer who will consume the servings. The destination information preferably links the user, with a customer, serving, location, and/or amount of payment. This type of information may be entered using a keypad, keyboard, touch pad or touch screen, etc., that is connected to the database. The entry means may be part of the dispensing apparatus, register or scale.

In step 906, a user places dispensing apparatus in a ready state that allows dispensing apparatus to run linking step 916 which links dispensing information 908 to destination information 910 stored on database. In linking step 916, dispensing information 908 is linked to destination information 910 based on the appropriate reconciling processes. In linking step 916, once the appropriate information has been linked, then the information is processed in step 917. If, in step 917, there is a successful link, then dispensing apparatus may be placed in an activated state, in step 918. In step 917, if there is a problem linking dispensing information 908 to destination information 910, an error 920 is reported and the dispensing apparatus is placed in a stand-by state, in step 922. The error may be sent as an alert in step 920 and stored in database 914.

In step 918 when dispensing apparatus is in an activated state the user, in step 924, may activate a control device, such as a push-button, to start the dispensing in step 926. In one embodiment the dispensing may use a timer valve. The timer valve controls the dispensing of the serving based on opening the timer valve for a duration of time in correspondence to a known allocated time period. An allocated time period starts in conjunction with the timer valve as the timer valve begins to dispense the servings and ends when the serving quantity is satisfied. In step 928, if the serving is not dispensed, dispensing apparatus returns to step 924 and resets. In step 928, once the serving is dispensed by dispensing apparatus the data is collected and sent in step 930 and dispensing apparatus is placed in a stand-by state, in step 922. Also, in step 928, regardless of whether the serving is dispensed, entries are made into the database. Other errors that occur during the process, such as those in step 920, are reported and recorded in the database on the storage medium 914. In step 924, if the activation device is not activated within an allocated time period, the dispensing apparatus, in step 932, will time out and return to ready state, in step 906.

In some embodiments of the present invention, steps 916 and 917 may be optional, and after the dispensing apparatus or sensor device is in a ready state, the dispensing apparatus may begin in step 924.

In step 918, when a non-fluid contacting sensor device is attached to dispensing apparatus, the embodiments of the present invention may activate the sensor device in step 924. The activate state in a sensor device may allow the sensor device to begin to measure a tilt condition. Any tilts that occur prior to the activate state may cause an alert or flag an error. A start timer may begin in step 926 to determine if a tilt condition is occurring. In step 928, if the tilt condition has not begun, sensor device returns to step 924 and resets. In step 928, once the serving is dispensed by dispensing apparatus and tilt condition is completed, sensor device is placed in a stand-by state in step 922. Also, in step 928, regardless of whether the serving is dispensed, entries are made into the database on storage medium 914. Other errors that occur during the process, such as those in step 920, are reported and recorded on storage medium 914. In step 924, if the activation device is not activated within an allocated time period, the dispensing apparatus, in step 932, will time out and return to ready state, in step 906.

Further embodiments of the present invention may activate a non-fluid contacting sensor device and/or the scale in a similar manner as described above.

The database and storage medium 914 shown in FIG. 9 for point-of-sale information may be the same database that stores data related to the scale, cameras, and/or sensor device, such as tilt data. In addition the database may store POS recipe data along recipe information.

FIG. 10 is a flowchart for operating and entering information associated with one or more cameras that may be used in combination with the embodiments of the present invention. Any of the exemplary camera systems shown in FIGS. 6A, 6B and 6C may be used, as well as other cameras. The images or video may be used to determine the type of beverage that has been served, by comparing such visual evidence with the library of bottle caps or label images in a database. The term image refers to a still frame of a picture, while video refers to a series of frames for several pictures. It should be understood that the terms images and video are interchangeable for the purposes of the embodiments of the present invention.

In one embodiment, the system of the present invention saves images during the duration of a specific event, for instance, the tilt of a dispensing container or the motion of a handle on a dispensing apparatus. FIG. 10 is a flowchart which illustrates the process for automatically identifying a trigger condition which saves the images. A similar method may also be used for data obtained from an RFID or barcode. In some embodiments the system may also saves images immediately before and after the triggering event, enhancing the context of the image or video of the dispensing event and providing information for auditing purposes. In step 1000, the current frame of the video is captured from a camera. In step 1002, a determination is made as to whether the maximum slots in the buffer have been filled. If, in step 1002, the maximum slots have not been filled, then, in step 1004, the current frame is saved to the buffer 1006. If, in step 1002, the maximum slots have been filled, then, in step 1008, the captured frame is moved to the first frame buffer. In step 1010, the oldest frame is removed from the frame buffer. In step 1012, a determination is made as to whether there has been a trigger to save the buffer to a file system. Triggering events include the attaching or detaching of sensor device from a dispensing apparatus, a valve timer opening, a dispensing container opening, a scale measurement or another activity associated with a dispensing event.

If, in step 1012, there has been a trigger, then, in step 1014, the date and times of the start and end of the dispensing event are obtained from the database. If, in step 1012, there is no trigger, then the current image frame continues to be captured, as in step 1000. In step 1016, the frames that correspond to the start and end times of the triggering event are sought in the video buffer. The start frame corresponds to the start time and the end frame corresponds to the end time. In step 1018, it is determined whether the start and end frames can be located. If, in step 1018, the start and end frames cannot be located, then step 1016 is repeated and the start and end frames are sought. If, in step 1018, the start and end frames are located, then, in step 1020, the preceding and succeeding frame settings are obtained.

The frame settings are the number of frames before and after the triggering event that are to be saved in the storage medium or personal computer. These settings are set in advance according to the management's preference. It is important to save enough frames to provide a video context for the triggering event and yet not so many frames that personal computer's resources are negatively affected. In one exemplary embodiment, a setting of 25 frames provides a satisfactory video context, i.e., 25 frames before the start of a triggering event begins and 25 frames after a triggering event ends.

In step 1022, a determination is made as to whether the video buffer contains preceding and succeeding frames that satisfy the requirements of the frame settings. If, in step 1022, preceding or succeeding frames that satisfy the requirements of the frame settings do exist, then, in step 1024, the preceding frames are added before the start frame and the succeeding frames are added after the end frame. In step 1026, the start and end frames, the series of frames in between, and any preceding and succeeding frames are saved as an image or video file. If there are no preceding or succeeding frames, then, in step 1026, the start and end frames, and the series of frames in between, are saved as an image or video file. Embodiments of the present image may save images as .jpg, .gif, .pct, .pif, .png, .plt, .tiff, .bmp, .wmf, etc., file and video as .avi, .wmv, .mpg, .qtm, etc., file.

Data from scales, sensor devices, entry devices, and cameras may be stored in a database. In embodiments of the present invention, the database is in a storage medium in a computer, such as a personal computer. Once the data is gathered, systems of the present invention may reconcile the data to generate bills, tracking, inventory management, etc. In some embodiments only certain types of data is used to be reconciled. Software installed on the computer may perform one or more of the steps for reconciling the data.

FIGS. 11A and 11B are a flowchart showing the process to reconcile data in accordance with one embodiment of the present invention to determined that a dispense event has occurred. The reconciliation links data sets from two or more different devices used in the present invention. Once a dispense event is determined and the data is linked, the system is able to monitor the dispensing of beverages. Such data may come from the sensor device, scale apparatus, dispensing valve, POS entry means, RFID detector, camera, bar code reader, or recipe database. In FIGS. 11A and 11B the data being reconciled comes from a sensor device, scale apparatus, and POS entry means. It should be readily appreciated to one of ordinary skill in the art that different combinations of data sources may be use a similar reconciling procedure as shown in FIGS. 11A and 11B. For example in some embodiments the weight data generated by the scale may be related to the POS data. In other embodiments, the tilt conditions of several dispensing apparatus may be related to a single scale time. In still other embodiments, the weight of the container may be related to a brand of beverage using a recipe database. In still other embodiments, the weight from the scale may be related to sensor data that obtains the volume using a pour rate calculation. In still other embodiments, tilt conditions may be related to a scale time from a scale assigned to a beverage. Such examples are intended to be illustrative and not limiting.

In step 1102 the system begins by identifying when a motion event occurred. The timestamp associated with the motion event is marked and the system begins in step 1104 to identify any scales that were activated after the motion event. The system may only include those systems which were activated within a user-defined adjustable time window from the motion event, such as 0-25 seconds. If no scales are activated, then in step 1106 the system checks to see if a sensor device is activated. If no sensors devices are activated then the motion event in step 1102 is disregarded in step 1108. If a sensor device is activated in step 1106 and there is no scale activation in step 1104, then an alert in step 1110 may be made.

Assuming the scale is activated in step 1104, then in step 1112 the system determines whether the data associated with the activated scale contains at least one weight change. In some embodiments the change of weight may be a gradual weight change measured from a container that receives a beverage on a scale. The end weight obtained by measuring the gradual weight change may be used. In other embodiments the change of weight may be made between two discrete weight measurements. If no weight change is made in step 1112, the system makes an alert in step 1114.

In step 1112, if there is a weight change, the system performs two operations. These operations may be performed sequentially, simultaneously, or in an alternating manner. One operation involves pulling the scale duration in step 1116. The term "pulling" refers to retrieving data from a database and copying such data to a temporary location so that it may be analyzed. Examples of pulling may involve placing or copying the data in a buffer, cache, memory, etc. In one embodiment the duration is a scale time indicating the length a container remained on a scale. In other embodiments the duration is a pour time indicating the duration between two discrete scale measurements. Next in step 1118, the system looks for sensor devices that were activated within the scale duration. Some embodiments start by looking for any duration from a sensor device that occur entirely within a scale duration and then by looking for any duration from a sensor device that begun within a scale duration and end within a user-defined time window after the sensor device. In establishments that use more than one scale, it may be possible to have several sensor devices that meet these criteria. If there are no sensor devices activated during this time, then in step 1120 an alert is made. Assuming there is a sensor device that is activated, the system pulls the sensor data in step 1122. Next in step 1124 the pulled scale data and sensor data is correlated in the database to identify possible matches. In some embodiments there may sensor data from multiple dispensing apparatus, reflecting that during the dispensing event multiple types of beverages were used to make a mixed drink.

In a second operation, the system in step 1126 pulls the data from the scale relating to the weight change. Next in step 1128 the system identifies point-of-sale information that was made or entered within a user-defined time window. It should be understood that in some embodiments, a conversion from volume to weight may be necessary to correlate the weight data with the POS information. Embodiments of the present invention may use a user-defined time window of several minutes to account for the delay between a POS ring-up and a dispensing event. If no point-of-sale information was entered, then in step 1130 an alert is made. Assuming that the system identifies point-of-sale information, then such point-of-sale information is pulled in step 1132. Next in step 1134 the pulled scale data and sensor data is correlated in the database to identify possible matches. In some embodiments, in which a tilt sensor may be used, the sensor data may be used in place of the point-of-sale information. The sensor data obtains a volume based on a pour rate calculation.

After completion of the first and second operations, the system in steps 1136 and 1138, respectively, determines how many matches exist from the correlation in step 1124 and 1134, respectively. When there is only one match in steps 1136 and 1138, the system creates a combined data in step 1140. Next the system in step 1142 checks the combined data to ensure accuracy. This check may determine whether the weight change from the second operation would be the expected approximate weight change based on flow rate calculations from the sensor device. In addition, embodiments may check the data by counting the number of servings entered with the point-of-sale information with the number of tilt conditions sensed by sensor device. Additional data checks may be used which correlate the data from the second operation to the data of the first operation. Once verified, in step 1144 the system generates one or more outputs. These outputs may include generating a bill for a customer and/or tracking data for inventory.

Upon a successful match there may be a discrepancies between the amount entered with the POS data and the weigh. For instance if a 2 ounce pour is weighed but the recipe information for the paid beverage, based on the POS recipe data, is 1.5 ounces, then the exception will be 0.5 ounces or an over pour of X %.

However, if in step 1142 the check fails, then a probability subroutine may be used to verify the data in step 1146. Examples of various subroutines are described below.

Returning to steps 1136 and steps 1138, if there is more than one match, the system combines the lists in step 1148 so that additional correlation steps may be performed. These correlation steps may involve comparing data from the first and second operations, identification data, probability estimations, or by re-adjusting time windows. Once the lists are combined, the system in step 1150 pulls all the data relating to the scale, sensor device and point-of-sale information to perform probability subroutines in step 1152.

FIGS. 11A and 11B show one exemplary subroutine using identification information and device IDs that may be used with one embodiment of the present invention. In step 1154 checks to see if each scale that was activated was assigned to a user, using a unique ID of the scale. If yes, in step 1156, the system matches the scales that were activated with the user identification information entered with the point-of-sale information. When a match is found, in step 1158 the system determines whether the data from the match is approximate. This may mean that the weight data from the scale is more than ±5% different than the serving size entered with the point-of-sale information. Additionally, the approximation may involve finding a sensor time that exceeded the time window by not more than ±15%. Once system determines that the data is approximate, in step 1160 an output is generated.

However, if in step 1156 the user assigned to the scale does not match the user in the point-of-sale information then step 1162 checks to see if the sensor device is assigned to a user. Also, in step 1154 if the scale is not assigned to a user, the system in step 1162 checks whether the sensor device is assigned to a user. In step 1164, if the sensor device is assigned, the system determines whether that user was working at the establishment by checking a schedule, pay record or a time sheet. If there is a match, then in step 1166, the system checks to see if the data is approximate and if yes generates outputs in step 1160. In steps 1162, 1164 or 1166 if the result are no, then a second subroutine may be performed in step 1168 until an output is generated in step 1160.

Outputs provided by a running a subroutine may be flagged so that management may manually review the data during an inventory check to account for any discrepancies.

Each alert shown in FIGS. 11A and 11B may be made in real-time by sending a message to a manager, such as a telephone call, page, e-mail, visual indication by LED, etc. In other embodiments the message may also be made by flagging data in the inventory for later action. Some embodiments may combine both a real-time message and a flagged data.

Using the process shown in FIGS. 11A and 11B, embodiments of the present invention may reconcile various data to determine which dispensing event relates to the dispensing apparatus poured, i.e. a particular brand of alcohol. Such embodiments may identify a poured beverage by tracking the duration of a sensor device and comparing that duration with duration of a change in weight of a scale. This allows the system to determine that a sensor device on a dispensing apparatus was moved at time X1 and at time X1+Y1 a scale registered a gradual weight increase. Also, it may be determined that the weight increase stopped at time X1+Y2 and the motion sensor stopped at time X2+Y2. Once the weight stops, or stabilizes, the end weight obtained during the gradual weight increase may be used in further correlation steps.

Alternatively, in FIGS. 11A and 11B, the reconciliation method may suitable data from the tilt sensor with data from a RFID, bar code or camera. In such scenarios the timestamp from these components is used instead of the tilt sensor.

Figure 12:
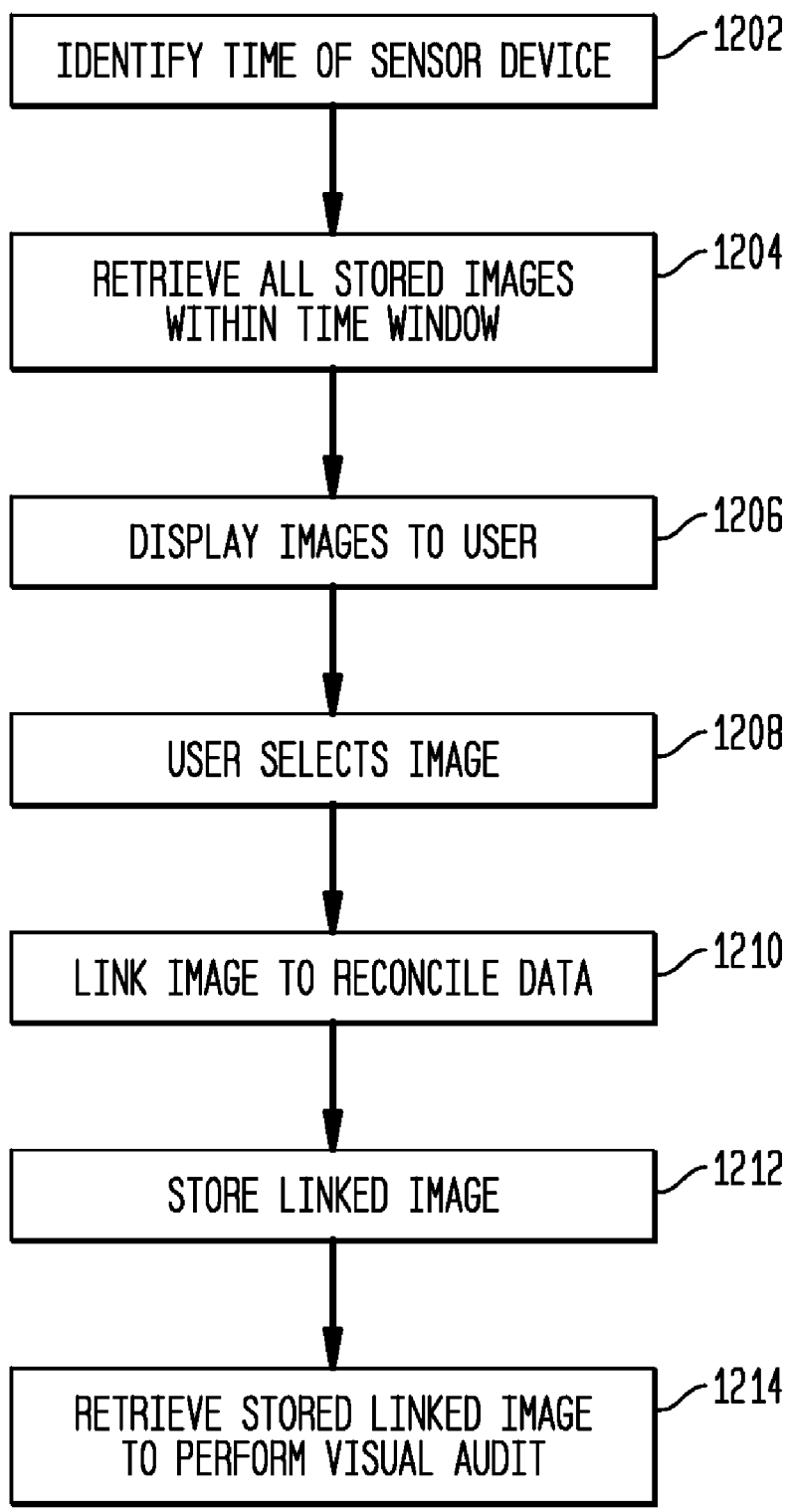
FIG. 12 is a flowchart of the video auditing process in accordance with one embodiment of the present invention.

In FIG. 12 there is shown a video audit process for embodiments of the present invention. In step 1202 the time the sensor device began is identified based on the sensor device that was correlated with the scale data and point-of-sale information. Since the data is already correlated, other embodiments may use the time the scale is activated in step 1202. In step 1204 all the stored images or videos are retrieved from every type of camera. In step 1206 the images or video is displayed to the user as a series of pictures or thumbnail pictures. In step 1208 the user selects the image or images that are associated with the dispensing event. In some embodiments, the system may suggest which images should be selected by comparing the image with a database of bottle caps and labels. Such a database may be updated when new dispensing apparatus are placed into the inventory. Next, in step 1210 the system links the image with the reconciled data and stores the data in 1212. Thus, when a visual audit is performed the images associated with the reconciled data may be easily retrieved in step 1214.

In further embodiments, a manager may view images from the video audit system that captures a bartender attempting to improperly pour a dispensing apparatus. The system of the present invention may alert the manager to the improper pouring.

Another embodiment of a visual audit system is further described in U.S. application Ser. No. 09/964,679, the entire contents and disclosures of which is hereby incorporated by reference.

Figure 13A:
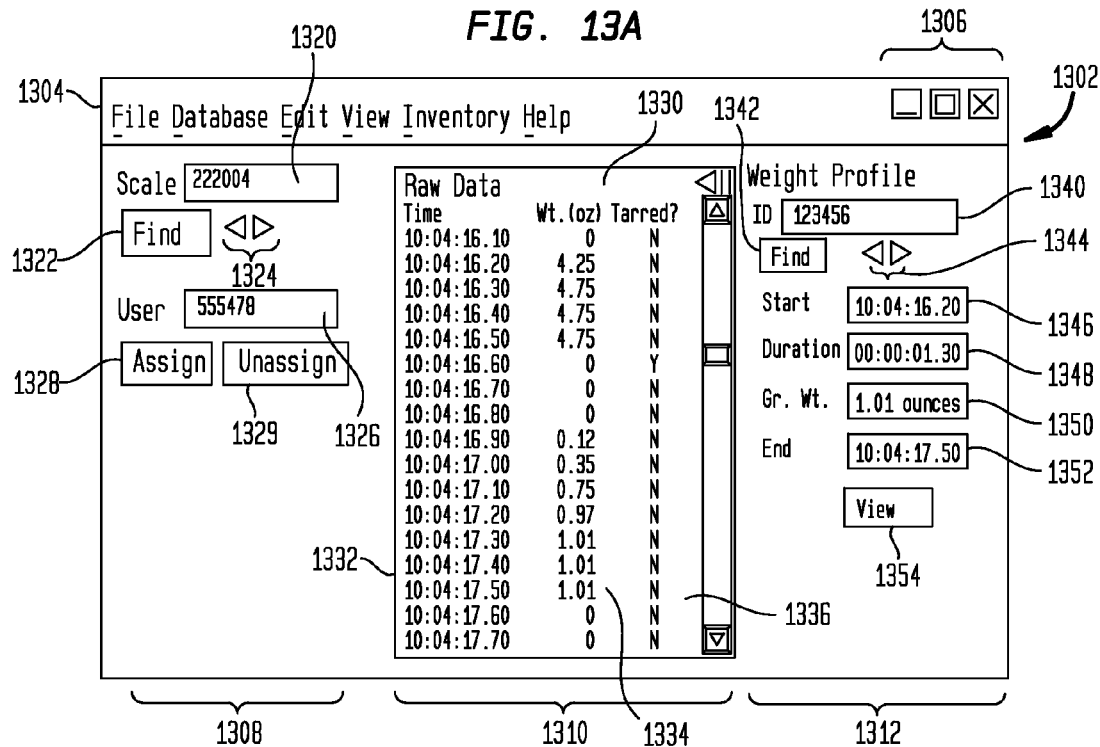
FIGS. 13A-13D are screen displays for various data in accordance with one embodiment of the present invention.

In embodiments of the present invention, the reconciliation process may be performed by software running on the personal computer. Such embodiments may provide visual representation of the data, such as the screen shots shown in FIGS. 13A-13D. The data may be displayed prior to reconciliation processing as shown in FIG. 13A—screen display 1302 of scale data, FIG. 13B—screen display 1302 of tilt data, and FIG. 13C—screen display 1302 of point-of-sale information. Embodiments of the present invention may also display the data during the reconciliation process as shown in FIG. 13D—screen display 1302 of the scale data being correlated with the tilt data, and scale data being correlated with the point-of-sale information. The layout and design of screen displays 1302 shown in FIGS. 13A-13D may be adjusted or changed depending on the user's preferences, operating system of personal computer, software program, etc. The data shown in displays 1302 may be sorted or organized according to different parameters and settings which may be user-adjustable.

In FIG. 13A, there is shown display 1302 having a menu bar 1304 and window buttons 1306. Menu bar 1304 may contain a variety of database and software functions. Display 1302 is divided into three sections, identification section 1308, raw data section 1310 and weight profile section 1312. In section 1308 there is an input box 1320 that displays the scale's identification number. Using the find button 1322 or arrows 1324, a user may switch between scales. Below there is user identification input box 1326 and assign button 1328 and unassign button 1329. Using buttons 1328 a sub-window may appear to allow the selection or entry of the user to be assigned. Selecting button 1329 would clear input box 1326. In section 1310, there is a spreadsheet 1330 containing data in three columns, time column 1332, weight column 1334 and tared indicator column 1336. Section 1310 also has a button 1338 to hide spreadsheet 1330. In section 1312, there is an input box 1340 for assigning a weight profile a unique identifier along with a find button 1342 and arrows 1344 for moving between weight profiles. Below are several data boxes for displaying start time when scale is activated 1346, duration of scale time 1348, gradual weight determined amount or end weight 1350 and time when scale returns to zero 1352. Also a view button 1354 may display the weight profile in a graphical form in a sub-window.

Figure 13B:
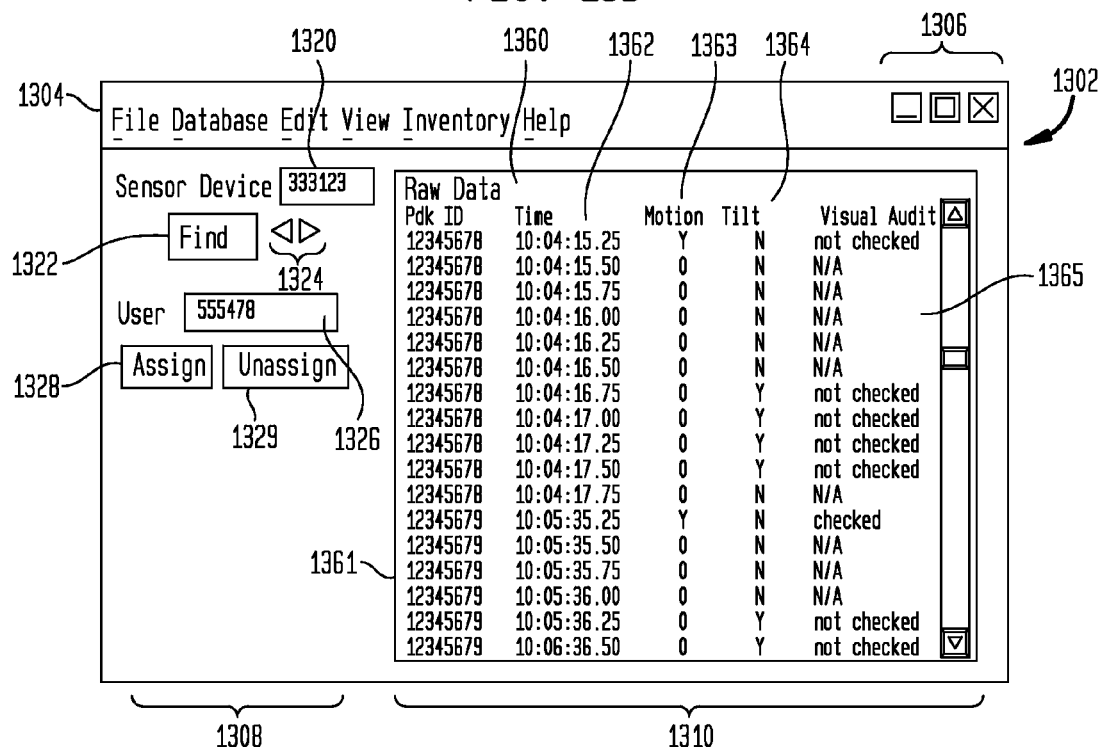

In FIG. 13B, there is shown display 1302, menu bar 1304, window buttons 1306, and two sections: identification section 1308 and raw data section 1310. In section 1308 there is an input box 1320 that displays the sensor device's identification number, along with a find button 1322, arrows 1324, user id box 1326 and assigning buttons 1328 and 1329. In section 1310 there is a spreadsheet 1360 having five columns: transmission package identification 1361, time for sensor device 1362, motion indicator 1363, tilt indicator 1364 and visual audit status 1365. In some embodiments, sensor device transmits data after the tilt event and that transmission may be assigned an id for tracking, which is shown in column 1361. In some embodiments motion indicator column 1363 may not be necessary when the motion sensor is separate from sensor device, i.e. a shelf sensor. In some embodiments visual audit column 1365 may not be present or may be present in a different screen within the software program.

Figure 13C:
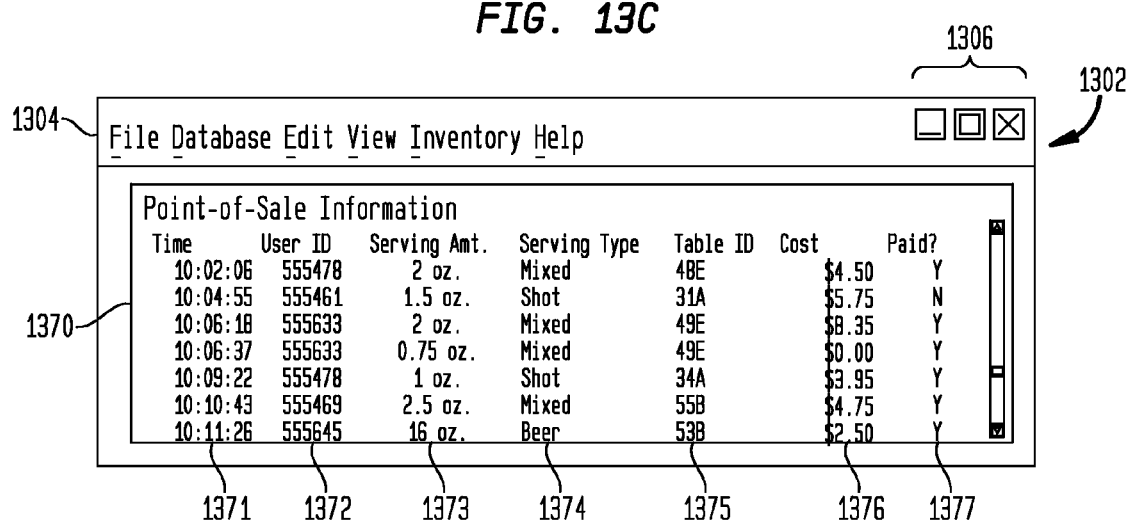
Figure 13D:
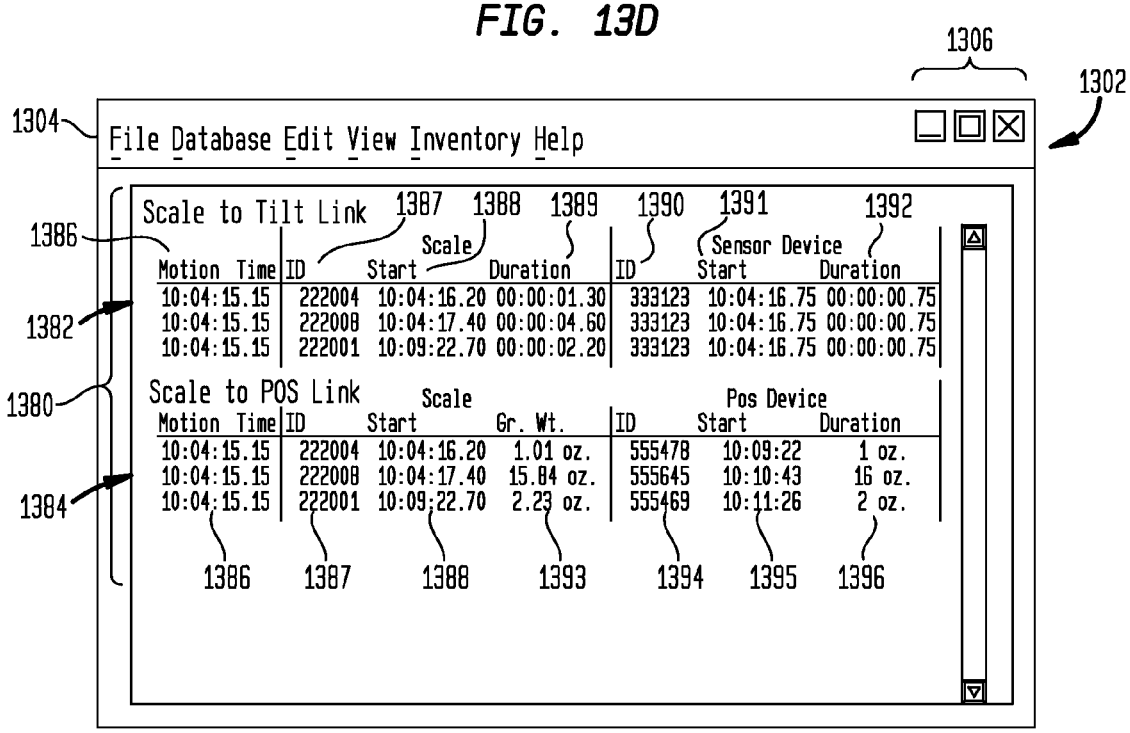

In FIG. 13C, there is shown display 1302, menu bar 1304, window buttons 1306, and spreadsheet 1330. Spreadsheet 1370 has seven columns: time of point-of-sale entry 1371, user identification who entered point-of-sale information 1372, serving amount size 1373, serving type 1374, destination information 1375, cost of serving 1376 and a pay indicator 1377. Serving type 1374 may be general as shown in FIG. 13C or more specific such as the type of drink, i.e. name of mixed drink, or brand of beverage. The available serving types 1374 may be stored in a recipe database that shows for example the type of alcohol with amounts and costs. In some embodiments the system may suggest a drink from the price entered based on the price entered in the POS entry device.

In FIG. 13D, there is shown display 1302, menu bar 1304, window buttons 1306, and a split spreadsheet 1380 having "scale to tilt link" spreadsheet 1382 and "scale to POS link" 1384. In spreadsheet 1382 there are the following columns: motion time start column 1386, scale id column 1387, scale start time 1388, scale duration 1389, sensor device id 1390, start time of sensor device 1391, and duration of sensor device 1392. In spreadsheet 1384 the following columns are present: motion time start column 1386, scale id column 1387, scale start time 1388, gradual weight or end weight column 1393, user identification column 1394, start time of point-of-sale information 1395 and serving amount size 1396.

It should be understood to one of ordinary skill in the art that the exemplary screen displays of FIGS. 13A-13D may be viewed in real-time or after the dispensing event as part of an inventory check.

As shown in the exemplary screen displays of FIGS. 13A-13D the data gathered by embodiments of the present invention may be linked and reconciled so that the data from a scale may be correlated to a sensor device on a dispensing apparatus and to point-of-sale information. Such correlation may allow the bartender or waiter to operate in an efficient manner without manually correlating the data. One advantage of such embodiments is the environment of the establishment will not be hindered by an error-prone manual method or bulky computerized systems which interfere with the bartenders or waiters. Also such embodiments may provide the ability to continually track and monitor the dispensing of beverages.

In embodiments of the present invention the system and method may use a weight profile for reconciling some of the data. In exemplary embodiments, the weight profile may represent a gradual weight change over a time period. The gradual weight may end when the weight stabilizes, i.e. no further beverages are added to the container. FIGS. 14A-14D show exemplary weight profiles for containers and dispensing containers/apparatuses. The data generated by the scale may be used to calculate scale duration and the approximate weight change. Each scale may measure weight at intervals, such as 0.1, 0.5, 1 or 2 seconds, depending on the programmed selections of the user.

A weight profile may be used in correlating a weight change measured by the scale that approximates a serving entered with the point-of-sale information. Embodiments of the present invention seek to approximate the weight with a serving instead of only matching exact weights since the scale measurements may be slightly off due to drift in the scale readings, or imprecise pouring. For example, then a gradual weight increase having a total weight of 2.3 oz, i.e. end weight, may approximate a serving that is entered as 2.0 oz. The tolerance for the approximation may be adjusted by the establishment or the system as necessary. Approximating weights allows the users of the present invention to operate at greater efficiency since such users are not slowed down by precisely measuring a beverage on a scale. Precise measurement using a scale with several digits that requires time to adjust for drift or other scale imperfections, may be frustrating to a bartender in a high-pace establishment and may discourage the bartender from measuring the weight.

Even though embodiments of the present invention approximates the measured weight with the entered weight from the POS entry device, the systems and methods uses the actual measured weight when calculating volume amounts, pour rates, etc. Thus, for inventory purposes if 2 oz was rung up and 2.45 oz was measured and correlated, the inventory would be subtracted by the measured weight. The difference of 0.45 oz may be reported as an overage. The overage may be attributable to a particular bartender so that individual performance may be measured. Alternatively, the difference may be used in calculating the cost of goods or pricing of mixed drinks.

Figure 14A:
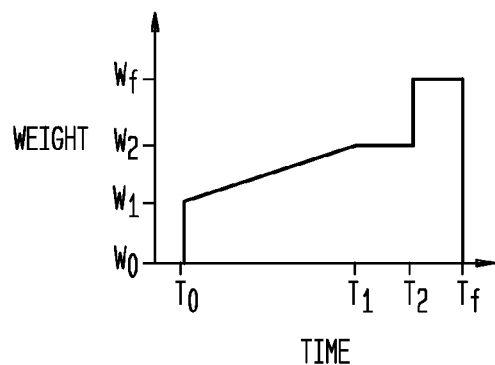
FIGS. 14A-C are graphs of a weight profile for scale time in accordance with one embodiment of the present invention.

In some embodiments, the system of the present invention may exclude changes in weight that are not gradual from the change weight. In FIG. 14A there is shown at $T_0$ a sudden increase in weight followed by a gradual increase from $T_0$ to $T_1$. The system of the present invention may flag this duration $(T_1-T_0)$ to be reconciled with a tilt event. Also, in FIG. 14A there is a constant duration between $T_1$ and $T_2$ and may indicate no activity on the scale. During $T_1-T_2$ the weight stabilizes and an end weight may be determined. At $T_2$ there is a rapid increase in weight and may indicate the addition of ice, fruit or other garnish. Between $T_2$ and $T_f$ there is a constant period indicating no activity on the scale. At $T_f$ there is a rapid decrease in weight and may indicate the removal of the container from the scale. Once the weight returns to zero, the system records the $T_f$ and determines the scale time by subtracting $T_0$ from $T_f$.

Figure 14B:
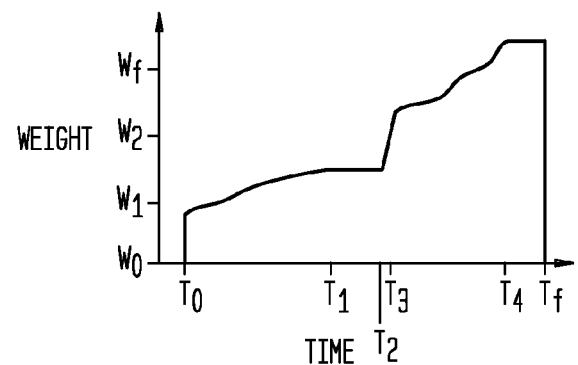

In FIG. 14B, there is shown at $T_0$ a sudden increase in weight followed by a gradual increase from $T_0$ to $T_1$. The system of the present invention may flag this duration $(T_1-T_0)$ to be reconciled with a first tilt event. As compared with FIG. 14A, the line between $T_0$ and $T_1$ is non-linear, but maintains an overall gradual increase. This may reflect the gurgling of a beverage as it is poured from the dispensing container. From $T_1$ to $T_2$ the duration is constant indicating no activity on the scale. In some embodiments this may be the end weight for a first type of beverage. At $T_2$ there is a rapid increase in weight and may indicate the addition of ice, fruit or other garnish. The rapid increase may be due to a user bumping or accidentally contacting the scale, such as placing a hand on the scale. However, the increase is not as sudden as in FIG. 14A, and the system notes the increase ends at $T_3$. Since the increase between $T_2$ and $T_3$ is not gradual, the system will not add this weight increase. Between $T_3$ and $T_4$ there is a second gradual increase reflecting an additional liquid or beverage. The system of the present invention may flag this duration $(T_4-T_3)$ to be reconciled with a second tilt event. This additional liquid may reflect a second amount of same beverage or a second beverage that is mixed or combined. At $T_4$ the gradual increase stops and from $T_4$ to $T_f$ there is a constant weight and no change. Again, once the weight returns to zero, the system records the $T_f$ and determines the scale time by subtracting $T_0$ from $T_f$.

Figure 14C:
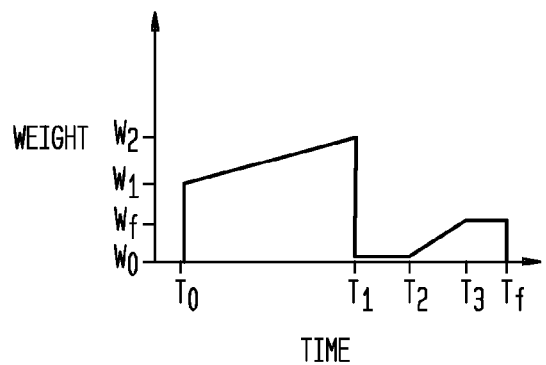

In FIG. 14C there is shown at $T_0$ a sudden increase in weight followed by a gradual increase from $T_0$ to $T_1$. Systems of the present invention may flag this duration $(T_1-T_0)$ to be reconciled with a first tilt event. At $T_1$ the user tares or zeros the scale so that the weight resets to zero. This does not complete the weight profile, since a taring or zeroing will be flagged for the system. It should be appreciated that the taring or zeroing may usually occurs after the container is initially placed on the scale, but prior to the dispensing of the beverage. From $T_1$ to $T_2$ the duration is constant indicating no activity on the scale. Between $T_2$ and $T_3$ there is a second gradual increase, reflect an additional beverage, as discussed with FIG. 14B. From $T_3$ to $T_f$ there is a constant weight and no change. Again, once the weight returns to zero, the system records the $T_f$ and determines the scale time by subtracting $T_0$ from $T_f$.

Figure 14D:
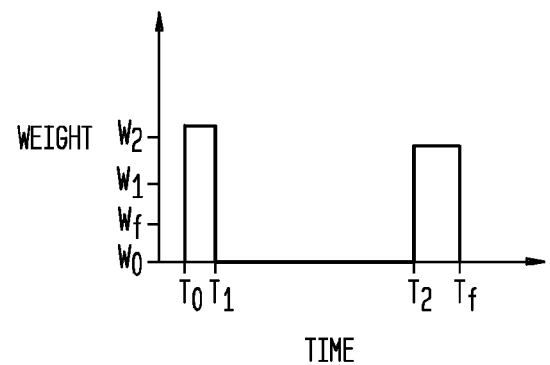
FIG. 14D is a graph of a weight profile for a pour time in accordance with one embodiment of the present invention.

In FIG. 14D, there is shown a weight profile relating to another embodiment of the present invention. In this embodiment, the weight is a measurement of the dispensing apparatus plus the beverage (DAP), instead of the container which receives the beverage. Thus, there are two separate weight measurements and two scale times may be calculated. First, the total scale time would be the difference from $T_f$ and $T_0$, while the pour time, i.e. the time associated with a pour, would be the difference from $T_2$ and $T_1$. The embodiments of the present invention would reconcile tilt data occurring substantially within the pour time. Assuming that there is tilt data, then it would be expected that there would be a difference between $W_1$ and $W_f$. However, if there is no difference, then pour time would be flagged as a non-pour event. This may occur when there is a customer change in the order during the pour of the bartender or waiter has made the wrong selection. Since there is no difference between $W_1$ and $W_f$, the pour time may be ignored.

Also, the embodiments of the present invention may also determine the approximate weight associated with gradual increases once the scale duration is completed. This determined may be made in a number of ways. For example, in FIG. 14A, the gradual change between $T_0$ and $T_1$ relates to the difference between $W_2$ and $W_1$. In FIG. 14B, the gradual weight change between $T_0$ and $T_1$ may be added to the second gradual weight change between $T_3$ and $T_4$ to determine the total approximate gradual weight change. In the other embodiment, shown in FIG. 14D, the difference in the DAP weight is the difference between $W_1$ and $W_f$. In some embodiments that measures DAP, $W_1$ may be determined from a weight stored in the database. The scale would still measure $T_1$ to determine the pour time, but would not have to measure the initial weight.

Different weight profiles may also be used when measuring the weight of the container. Instead of an initial taring once the container is placed on the scale, the initial weight may be used in combination with the determined brands and recipe database to determine that a dispense event has occurred.

As discussed above, various embodiments of the present invention may obtain different types from information and reconcile that information according to various methods. These various embodiments may also be performed by software on a computer system using various components as described herein.

In one such embodiment of the present invention, the system or computer may perform the following methods to determine the information related to a dispensing event. Each scale in an established is assigned a unique ID which identifies a particular user of the scale, such as a waiter, server, or bartender. Each bottle has a sensor which identifies in the sensor unique ID the product data of the bottle, i.e. the bottle and total volume of bottle. The sensor may be a contactless type sensor as described herein. During the dispensing event the sensor measures the duration of the motion or tilt and uses a timestamp to record when the tilt occurred. After the dispensing event is completed, the bottle is placed on the assigned scale and the weight of the bottle and the timestamp when the weighing occurred is measured. All the data is sent as to a computer for reconciliation. The computer may reconcile the data from the sensor with the data from the scale using the reconciliation methods described herein, such as matching the timestamps from the sensor and scale. A successful reconciliation will allow one to determine what product, i.e. brand, was served, by whom, i.e. identity of waiter, at what time and the amount of beverage dispensed. Assuming that a match is made, the weight data may override the sensor data in the computer. Such a method may allow an owner to monitor the dispensing of particular waiters by assigning the scales a unique ID.

In another such embodiment, a number n of bottles is weighed before the establishment opens. The weighing may also be done before a shift, day/night shifts, or at the close of the establishment. The n bottles may be weighed individually or in batches. The n bottles may be weighed according to brand. The total weight $T_w$ of n bottles is recorded and the change of weight $\Delta T$ from the previous weighing is calculated and stored in a computer. The computer also has a POS recipe data that stores information relating the various recipes for beverages. The POS recipe data may at least include the amount of beverage to make each type of drink. In addition, the POS recipe data indicates the number of drinks that were purchased over the previous time period. Using the number of drinks, an expected amount of beverage E is generated by the POS recipe data. This expected amount is compared against the $\Delta T$ for the n bottles. Adjustments may be made for bottles that been depleted and replaced by new bottles in such an embodiment. The adjustment may be made by tracking the new bottles that have been used. Methods for tracking include scanning a uniquely placed bar code on the bottle or marking the bottle with a pen.

Using the POS recipe data compared against the $\Delta T$ for n bottles may allow a user to monitoring the dispensing of a beverage without using a motion sensor or other pour valve system. For example, if 6 additional ounces of one brand have been shown to be poured by $\Delta T$ more than the expected total recipe amount rung up for the same time shift and an average pour of that brand is 2 ounces, then the system may report 3 drinks were not paid for or there was over pour of X % (($\Delta T$−E)/number of drinks purchased) for all the drinks paid for. Alternatively, under pours may be tracked in a similar method when the $\Delta T$ is less than E. Such differences may be reported to the owner or manager as an alert to a cell phone, pager, PDA, etc.

In another such embodiment of the present invention, an establishment may use a number of scales in the place where the bottles are normally kept. For example, a scale is used on a shelf, in a cabinet or in a drawer. Each scale is assigned to measure a particular brand of beverage. A unique ID may be entered with each scale to identify the particular brand. After each use of a bottle, the waiter weighs the bottle. The scale reports the various weight changes to a computer. The computer tracks the time each weight change was made. Each drink that is purchased is entered in the POS entry means and sent to the computer. The POS data and weight change is measured and reconciled.

Using unique scale for each brand does not require a user to use a sensor device on the bottle for this particular embodiment. Also, if the scale measures a change in weight of a bottle that goes up then the software assumes the incorrect bottle was placed on the scale, unless the increase is or is close to the full bottle weight of that particular brand.

In embodiments of the present invention, there may be provided an inventory management system. The inventory management allows an establishment to monitor the sales data and usage data of particular brands of beverages. For example, the usage data from the scales may be reconciled with POS information, inventory data, server data and database history. This information may be used to track the performance of any server, scale, brand of beverage, or overall store performance. The inventory management may be performed on-site by the manager of the establishment or at a remote location using a Web server. The inventory management system also may allow reordering of supplies. The reorder document may be directly sent to the suppliers or persons responsible for reordering by a voice-automated telephone cell, e-mail, letter, fax, etc. Inventory management system may perform accounting function such as calculating costs, profits, margins, percentages, inventory values and amounts, including over and under pouring against recipe databases. In addition, the inventory management may send real time messages to the local processing unit to notify managers of any discrepancies.

Embodiments of the present invention may also have an error reporting function that may alert a manager or other supervisor of any discrepancy detected by the system. One method of reporting errors involves correlating the scale data with POS information, such as payment and recipe data. Any discrepancies may be highlighted in a report and may trigger a real time alert sent the manager's to a pager, cell phone or email. The present invention may set an alert condition, i.e. a visual or audio indication, when a change in weight or motion duration does not correlate to a POS data. An alert condition would indicate to the server that the potential for an error or fraud exists on a bill, unless the uncharged serving may be accounted for on the bill. An alert condition may be printed on a receipt so that the server may notify the manager of the establishment of the uncorrelated data. An alert condition may notify the user, the assistant to the user, the controller of the dispensing apparatus, i.e. management or headwaiter, or the owners of the business. An alert condition may end when the correlation is made or when a server collects the outstanding payment from the customer to satisfy the billing error.

In some establishments there may one or more scales, point-of-sale entry devices, or sensor devices to create a multi-scale environment. For example, a bartender may with to serve three drinks containing rum liquor. Instead of making one scale measurement for each pour, which may encumber the bartender, the bartender may make three pours into separate containers. The weight measurement from the scale would reflect an amount approximate to the three servings entered with the point-of-sale information. Also, there would be three dispensing events that would occur substantially within the time measurement from the scale. The present invention may correlate in a multi-scale environment by using statistical and probability calculations based on correlating the time a dispensing container was moved with a change in weight recorded by a scale. The statistical and probability calculations may include additional data, such as POS information, to increase functionality, accuracy and reliability.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for monitoring the dispensing of a beverage into a container comprising the following steps:
   measuring a scale time for the container on a scale;
   measuring a end weight for the container on the scale; and
   determining that a dispense event has occurred for the beverage based on whether a tilt condition of a dispensing apparatus occurred substantially within the scale time and based on whether the end weight of the beverage dispensed into the container approximates a serving based on point-of-sale information.

2. The method of claim 1, further comprising the step of entering dispensing information, destination information and identification information to create the point-of-sale information.

3. The method of claim 1, further comprising the steps of:
   generating tilt data by a sensor attached to the dispensing apparatus; and
   transmitting the tilt data after the tilted condition is completed.

4. The method of claim 3, further comprising the step of:
   determining the duration of the tilt condition, and time of the tilt condition based on the tilt data.

5. The method of claim 4, wherein the sensor does not contact the beverage dispensed from the dispensing apparatus.

6. The method of claim 3, further comprising an embedded processor for transmitting the tilt data, the scale time, the end weight and the point-of-sale information to a Web server.

7. The method of claim 6, wherein the embedded processor performs calculations on the tilt data, the pour time, the end weight and the point-of-information prior to sending such information to the Web server.

8. The method of claim 3, further comprising the step of storing the scale time, the end weight, the tilt data, and the point-of-sale information in a database.

9. The method of claim 3, further comprising the step of transmitting a unique ID of the scale and storing the scale unique ID in a database.

10. The method of claim 9, wherein the scale unique ID is assigned to a user.

11. The method of claim 3, further comprising the step of transmitting a unique ID of the dispensing apparatus and storing the dispensing apparatus unique ID in a database.

12. The method of claim 11, wherein the dispensing apparatus unique ID contains the brand of the beverage.

13. The method of claim 12, further comprising the step of determining the brand of the beverage dispensed from the dispensing apparatus.

14. The method of claim 1, further comprising the step of determining the brand of the beverage dispensed from the dispensing apparatus.

15. The method of claim 1, wherein the determining step is performed by at least one computer executing a set of instructions stored on a readable medium.

16. The method of claim 1, further comprising the step of notifying a user if the tilt condition is detected substantially outside of the scale time.

17. The method of claim 1, further comprising the step of notifying a user if the end weight of the beverage dispensed into the container does not approximate the serving.

18. The method of claim 1, further comprising the step of recording at least one image of the dispense event based on whether the scale measures the scale time.

19. The method of claim 18, wherein the at least one image is a video image.

20. The method of claim 1, wherein the end weight is based on a gradual weight, wherein the gradual weight excludes a rapid weight increase on the scale.

21. The method of claim 20, wherein the rapid weight increase is the result of a garnish being added to the container.

22. The method of claim 1, further comprising a means to activate the scale prior to the dispensing of the beverage.

23. The method of claim 22, wherein the activation means comprises a RFID detector for detecting a RFID tag on the dispensing apparatus.

24. The method of claim 22, wherein the activation means comprises a bar code reader for reading a bar code on the dispensing apparatus.

25. The method of claim 1, wherein the dispensing apparatus has a bar code and the tilt condition is sensed by a bar code reader reading the bar code.

26. The method of claim 1, wherein the dispensing apparatus has a RFID and the tilt condition is sensed by a RF sensor detecting the bar code.

27. The method of claim 1, wherein the scale comprises a display for displaying the dispensing information, the end weight, the scale time or the point-of-sale information.

28. A method for monitoring the dispensing of a beverage into a container comprising the following steps:
measuring a scale time for the container on a scale;
determining that a dispense event has occurred for the beverage based on whether a tilt condition of a dispensing apparatus occurred substantially within the scale time.

29. The method of claim 28, further comprising measuring an end weight for the container on the scale.

30. The method of claim 29, determining that the dispense event has occurred based on whether the end weight of the beverage dispensed into the container approximates a serving based on point-of-sale information.

31. The method of claim 28, wherein a tilt sensor measures the tilt condition.

32. The method of claim 31, further comprising determining that the dispense event has occurred based on whether the end weight of the beverage dispensed into the container approximates a serving based on data from the sensor.

33. A method for monitoring the dispensing of a beverage into a container comprising the following steps:
measuring a scale time for the container on a scale;
measuring a end weight of a gradual weight increase for the container on the scale; and
determining that a dispense event has occurred for the beverage based on whether a sensor measured a tilt condition of a dispensing apparatus substantially within the scale time and based on whether the end weight of the beverage dispensed into the container approximates a serving based on data from the sensor.

34. A method for monitoring the dispensing of a beverage comprising the following steps:
(a) measuring a pour time for a dispensing apparatus using a scale;
(b) measuring a change in weight for the dispensing apparatus using the scale; and
(c) determining of whether a dispense event has occurred for a beverage from the dispensing apparatus based on if a tilt condition occurs substantially within the pour time and based on if the change in weight for the dispensing apparatus approximates a serving based on point-of-sale information.

35. The method of claim 34, wherein step (c) further comprises determining whether a dispense event occurred based on tilt data obtained from the dispensing apparatus in addition to the pour time and the change in weight.

36. The method of claim 34, wherein step (b) further comprising measuring the dispensing apparatus at least twice.

37. The method of claim 36, wherein at least one measurement of the dispensing apparatus is made prior to the start of the pour time and at least one measurement is made after the completion of the pour time.

38. The method of claim 36, wherein the at least one measurement of the dispensing apparatus is made prior to the start of the pour time is stored in a database.

39. The method of claim 34, further comprising the step of entering dispensing information, destination information and identification information to create the point-of-sale information.

40. The method of claim 34, further comprising the steps of:
generating tilt data by a sensor attached to the dispensing apparatus; and
transmitting the tilt data after the tilted condition is completed.

41. The method of claim 40, further comprising the step of:
determining the duration of the tilt condition, and time of the tilt condition based on the tilt data.

42. The method of claim 40, wherein the sensor does not contact the beverage dispensed from the dispensing apparatus.

43. The method of claim 40, further comprising an embedded processor for transmitting the tilt data, the pour time, the change in weight and the point-of-sale information to Web server.

44. The method of claim 43, wherein the embedded processor performs calculating steps on the tilt data, the pour time, the change in weight and the point-of-information prior to sending such information to the Web server.

45. The method of claim 40, further comprising the step of storing the pour time, the change in weight, the tilt data, and the point-of-sale information in a database.

46. The method of claim 40, further comprising the step of transmitting a unique ID of the scale and storing the scale unique ID in a database.

47. The method of claim 46, wherein the scale unique ID is assigned to a user.

48. The method of claim 40, further comprising the step of transmitting a unique ID of the dispensing apparatus and storing the dispensing apparatus unique ID in the database.

49. The method of claim 48, wherein the dispensing apparatus unique ID contains the brand of the beverage.

50. The method of claim 49, further comprising the step of determining the brand of the beverage dispensed from the dispensing apparatus.

51. The method of claim 34, further comprising the step of determining the brand of the beverage dispensed from the dispensing apparatus.

52. The method of claim 34, wherein the determining step is performed by at least one computer executing a set of instructions stored on a readable medium.

53. The method of claim 34, further comprising the step of notifying a user if the tilt condition is detected substantially outside of the pour time.

54. The method of claim 34, further comprising the step of notifying a user if the change in weight of the dispensing apparatus does not approximate the serving.

55. The method of claim 34, further comprising the step of recording at least one image of the dispense event based on whether scale measures the pour time.

56. The method of claim 55, wherein the at least one image is a video image.

57. The method of claim 34, further comprising a means to activate the scale prior to the dispensing of the beverage.

58. The method of claim 57, wherein the activation means comprises a RFID detector for detecting a RFID tag on the dispensing apparatus.

59. The method of claim 57, wherein the activation means comprises a bar code reader for reading a bar code on the dispensing apparatus.

60. The method of claim 34, wherein the dispensing apparatus has a bar code and the tilt condition is sensed by a bar code reader reading the bar code.

61. The method of claim 34, wherein the dispensing apparatus has a RFID and the tilt condition is sensed by a RF sensor detecting the bar code.

62. The method of claim 34, wherein the scale comprising a display for displaying the dispensing information, the change in weight, the pour time or the point-of-sale information.

63. A method for monitoring the dispensing of a beverage comprising the following steps:
 measuring a pour time for a dispensing apparatus using a scale;
 determining of whether a dispense event has occurred for a beverage from the dispensing apparatus based on if a tilt condition occurs substantially within the pour time.

64. The method of claim 63, further comprising measuring an end weight for the container on the scale.

65. The method of claim 64, determining that the dispense event has occurred based on whether the end weight of the beverage dispensed into the container approximates a serving based on point-of-sale information.

66. The method of claim 63, wherein a sensor measures the tilt condition.

67. The method of claim 66, further comprising determining that the dispense event has occurred based on whether the end weight of the beverage dispensed into the container approximates a serving based on data from the sensor.

68. A method for monitoring the dispensing of a beverage comprising the following steps:
 (a) measuring a pour time for a dispensing apparatus using a scale;
 (b) measuring a change in weight for the dispensing apparatus using the scale; and
 (c) determining of whether a dispense event has occurred for a beverage from the dispensing apparatus based on if a sensor measured a tilt condition substantially within the pour time and based on if the change in weight for the dispensing apparatus approximates a serving based on data from the sensor.

69. A method for monitoring the dispensing of a beverage comprising the following steps:
 opening a valve timer connected to a dispensing apparatus by entering point-of-sale information;
 measuring a scale time for a container on a scale; and
 determining whether a dispense event has occurred for the beverage from the dispensing apparatus based on if the valve timer is opened substantially within the scale time and based on if the change in weight for the container approximates a serving based on point-of-sale information.

70. A method for monitoring the dispensing of a beverage into a container comprising the following steps:
 measuring a scale time for the container on a scale;
 measuring a gradual weight for the container on the scale; and
 determining that a dispense event has occurred for the beverage based on:
  whether a tilt condition of a dispensing apparatus occurred substantially within the scale time;
  identity of the dispensing apparatus; and
  the gradual weight.

71. The method of claim 70, wherein the identity of the dispensing apparatus comprises the brand.

72. A method for monitoring the dispensing of a beverage into a container comprising the following steps:
 determining whether a tilt condition of a dispensing apparatus has occurred substantially within a scale time; and
 if a tilt condition has occurred, determining whether a dispense event has occurred based on:
  identity of the dispensing apparatus; and
  a gradual weight.

73. The method of claim 72, further comprising measuring the scale time for the container on a scale.

74. The method of claim 72, wherein further comprising measuring the end weight for the container on the scale.

75. The method of claim 72, wherein the identity of the dispensing apparatus comprises the brand.

76. A method for monitoring the dispensing of a beverage comprising the following steps:
 measuring a total weight of a number of dispensing apparatuses weighed at the end of a time period;
 generating an expected weight from point-of-sale recipe data based on recipe information and the number of paid beverages purchased during the time period; and
 determining that the number of the paid beverages purchased were dispensed by reconciling the total weight with the expected weight.

77. The method of claim 76, further comprising measuring the total weight by measuring the number of bottles individually.

78. The method of claim 76, further comprising measuring the total weight by measuring the number of bottles in a batch.

79. The method of claim 76, wherein the number of bottles related to one type of brand.

80. The method of claim 76, wherein the recipe information comprises the amount and the type of the beverage.

81. The method of claim 76, further comprising reporting any differences between the total weight and the expected weight as an alert to a hand held electronic device.

82. A method of monitoring the dispensing of a beverage comprising:
 measuring a time that a change in weight of dispensing apparatus using a scale assigned to a brand occurred; and
 determining that a dispense event occurred for the beverage based on whether point-of-sale information is entered near the time and the point-of-sale information contains a purchased serving having the brand assigned to the scale.

83. The method of claim 82, further comprising measuring a tilt condition using a sensor attached to the dispensing apparatus.

84. A method for monitoring the dispensing of a beverage into a container comprising the following steps:
 (a) measuring a scale time for the container on a scale;
 (b) determining that selected beverages of a plurality of beverages have been served based on tilt conditions of each of the respective dispensing apparatuses for the selected beverages occurring substantially within the scale time; and
 (c) determining that a given mixed drink has been sold served based on the selected beverages in step (b).

85. The method of claim 84, wherein the given mixed drink is stored in a recipe database.

86. The method of claim 85, further comprising outputting the type of the given mixed drink as a drink name to a point-of-sale device.

87. A method for monitoring the dispensing of a beverage into a container comprising the following steps:
 (a) measuring a weight of the container on a scale;
 (b) sensing a tilt condition of a dispensing apparatus for a brand of beverage; and
 (c) determining the amount and type of the beverage served based on the weight of the container and the brand of the beverage that was sensed in step (b).

88. The method of claim 87, further comprising outputting the type of the beverage served as a drink name to a point-of-sale device.

* * * * *